United States Patent
Kneuper et al.

(10) Patent No.: US 10,669,015 B2
(45) Date of Patent: Jun. 2, 2020

(54) AUTOMATIC ADJUSTMENT OF CENTER OF MASS OF A VEHICLE

(71) Applicant: THE BOEING COMPANY, Chicago, IL (US)

(72) Inventors: Nils Kneuper, Bergkamen (DE); Ralf Rene Shu-Zhong Cabos, Braunschweig (DE)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 15/616,762

(22) Filed: Jun. 7, 2017

(65) Prior Publication Data

US 2018/0354610 A1    Dec. 13, 2018

(51) Int. Cl.
*B64C 17/10* (2006.01)
*G01M 1/12* (2006.01)

(52) U.S. Cl.
CPC ............. *B64C 17/10* (2013.01); *G01M 1/127* (2013.01)

(58) Field of Classification Search
CPC combination set(s) only.
See application file for complete search history.

(56) References Cited

U.S. PATENT DOCUMENTS

| 4,110,605 | A | 8/1978 | Miller |
| 4,937,754 | A | 6/1990 | Buisson et al. |
| 4,949,269 | A | 8/1990 | Buisson et al. |
| 5,975,464 | A * | 11/1999 | Rutan ............... B64C 39/02 244/118.2 |
| 8,548,721 | B2 * | 10/2013 | Paillard ............... B64C 17/10 244/135 C |
| 2010/0044515 | A1 | 2/2010 | Neto |
| 2010/0222945 | A1 | 9/2010 | Giesseler et al. |

FOREIGN PATENT DOCUMENTS

EP    0743582 A2    11/1996
WO    2010061156 A1    6/2010

OTHER PUBLICATIONS

Extended European Search Report for Application No. 18167211.4-1010 dated Aug. 17, 2018.

* cited by examiner

*Primary Examiner* — Adam D Tissot
*Assistant Examiner* — Edward J Pipala
(74) *Attorney, Agent, or Firm* — Patterson + Sheridan, LLP

(57) ABSTRACT

A method, vehicle, and system for calculating the location of a center of mass of the vehicle and transferring fuel to move the location of the center of mass are provided. The location of the center of mass of the vehicle is determined by measuring or calculating forces acting on the vehicle that counteract the gravitational forces on the vehicle. The location of the center of mass is calculated by determining on a moment arm of the gravitational force that counteracts the moment arms of the other forces acting on the vehicle. Fuel can be transferred among differently-located fuel tanks in the vehicle to move the location of the center of mass to a position in which at least some of the other forces acting on the vehicle are reduced, which may increase the speed and/or efficiency of the vehicle.

23 Claims, 12 Drawing Sheets

AUTOMATIC ADJUSTMENT OF CENTER OF MASS OF A VEHICLE

BACKGROUND

Aspects described herein relate to detecting and adjusting the center of mass (i.e., center of gravity) of a vehicle, and more specifically, to calculating a location of a center of mass of a vehicle and moving mass in the vehicle.

SUMMARY

According to one aspect, a method for calculating a center of mass of an aircraft during flight is provided. The method comprises detecting positions of control surfaces on aerodynamic bodies of the aircraft. The method also comprises calculating aerodynamic forces of the aerodynamic bodies based on the detected positions of the control surfaces. The method also comprises determining locations, relative to the aircraft, of centers of pressure of the calculated aerodynamic forces. The method also comprises receiving a current total mass of the aircraft. The method also comprises calculating a location of the center of mass of the aircraft, based on the calculated aerodynamic forces, the determined locations, and the received current total mass.

According to one aspect, an aircraft comprises a fuselage that includes a center fuel tank, a left wing extending from the fuselage that includes a left fuel tank, and a right wing extending from the fuselage that includes a right fuel tank. The left wing includes a left aileron and the right wing includes a right aileron. The aircraft also comprises a left elevator, and a right elevator. The aircraft also comprises a controller operable to detect positions of the left aileron, the right aileron, the left elevator, and the right elevator of the aircraft. The controller is also operable to calculate aerodynamic forces of the left wing, right wing, left elevator, and right elevator based on the detected positions. The controller is also operable to determine locations, relative to the aircraft, of centers of pressure of the calculated aerodynamic forces. The controller is also operable to receive a current total mass of the aircraft. The controller is also operable to calculate a location of a center of mass of the aircraft, based on the calculated aerodynamic forces, the determined locations, and the received current total mass of the aircraft.

According to one aspect, a system comprises at least one computer processor. The system also comprises a first input operable to receive signals indicating positions of control surfaces on aerodynamic bodies of an aircraft. The system also stores computer memory storing computer-readable program code. When executed by the at least one computer processor, the computer-readable program code performs an operation comprising calculating aerodynamic forces of the aerodynamic bodies based on the detected positions of the control surfaces. The operation also comprises determining locations, relative to the aircraft, of centers of pressure of the calculated aerodynamic forces. The operation also comprises receiving a current total mass of the aircraft. The operation also comprises calculating a location of a center of mass of the aircraft, based on the calculated aerodynamic forces, the determined locations, and the received current total mass.

BRIEF DESCRIPTION OF ILLUSTRATIONS

Figure 6A:
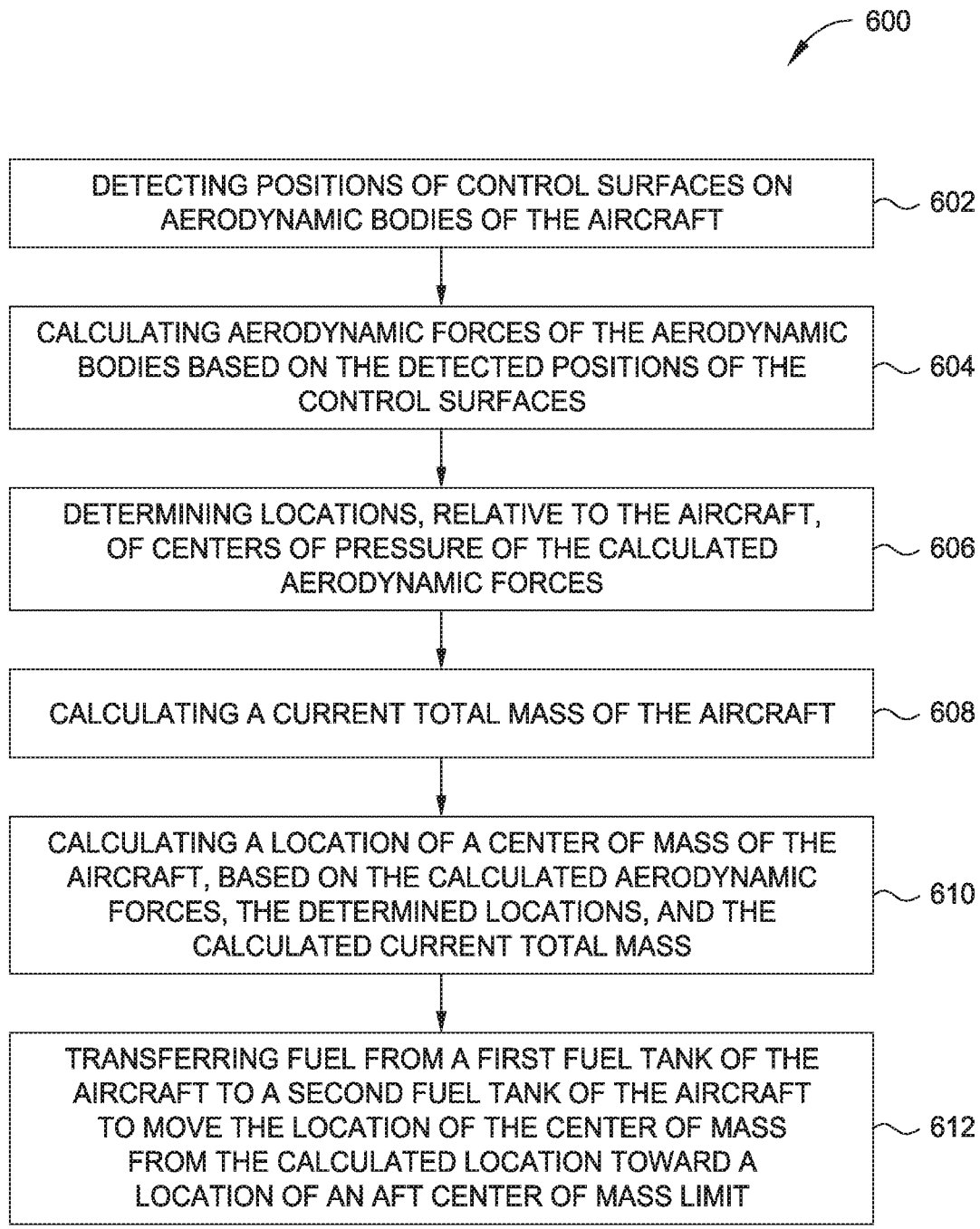
Figure 6B:
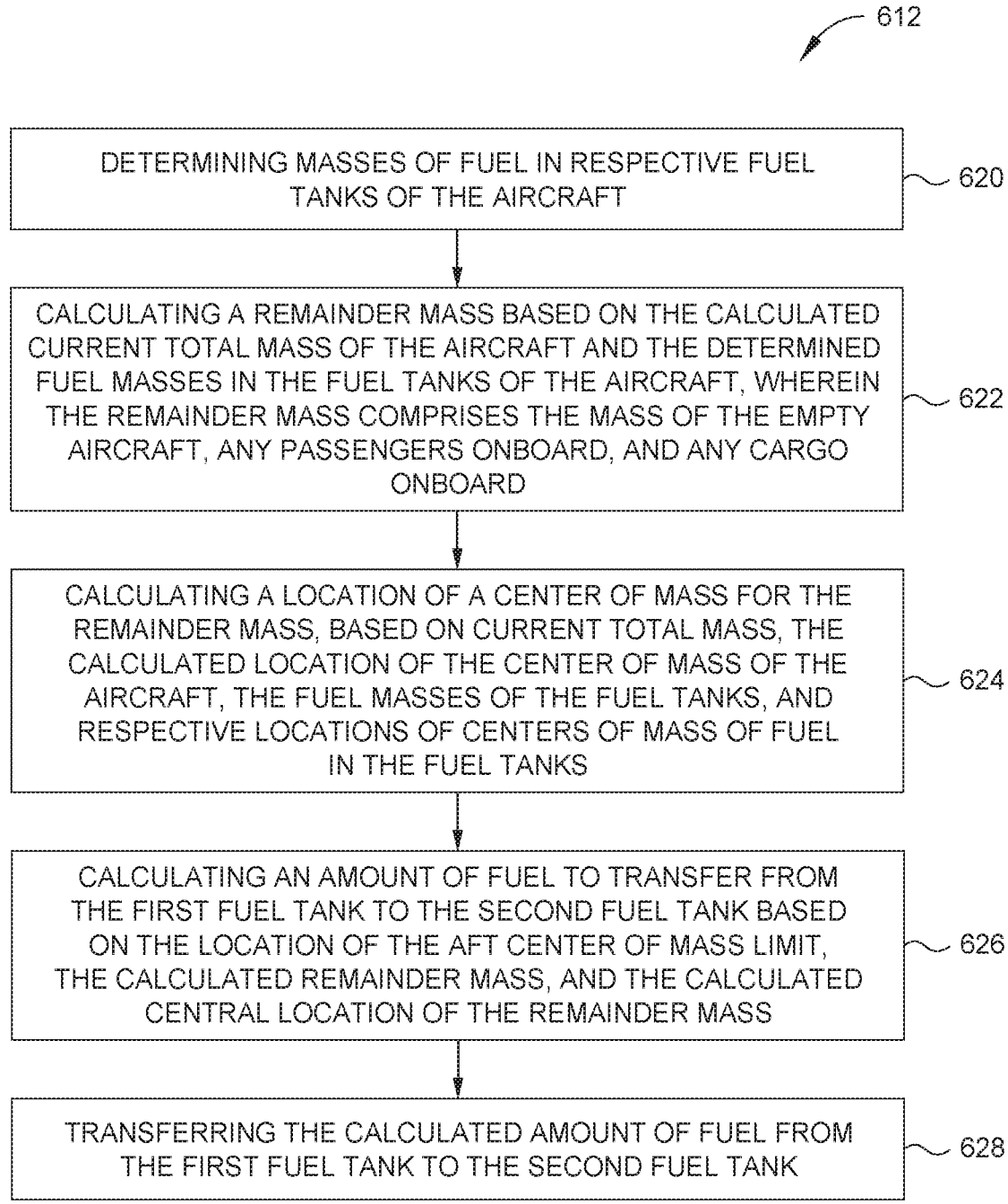

FIG. 6A is a flow chart of a method, according to one aspect, for calculating a location of a center of mass for an aircraft and transferring fuel from one fuel tank to another fuel tank to change the location of the center of mass; and FIG. 6B is a flow chart of a method, according to one aspect, for calculating an amount of fuel to transfer from a first fuel tank to a second fuel tank to affect a change of location of the center of mass of an aircraft.

DETAILED DESCRIPTION

Aspects are described below with reference to flowchart illustrations and/or block diagrams of methods, apparatus (systems) and computer program products according to aspects of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

Aircraft fly with the total center of mass of the aircraft located within a range of appropriate locations. For a typical aircraft configuration that includes elevators located at the aft end of the aircraft (and the wings positioned forward of the elevators), the center of mass is typically positioned forward of a center of lift of the wings for stability purposes. Control surfaces on the elevators exert aerodynamic forces to counteract the forward location of the center of mass as well as any pitching moment of the wing to maintain a constant pitch attitude. The aerodynamic forces exerted by the elevators result in drag that slows the aircraft and/or results in increased fuel consumption.

Additionally, the total mass of the aircraft may not be balanced side to side. For example, more passengers may be seated on one side of the aircraft than the other. As another example, more cargo (or heavier cargo) may be stowed on one side of the aircraft compared to the other side. As a result, the aircraft must add aerodynamic forces using ailerons on the wings to maintain a level roll attitude. The aerodynamic forces exerted by the ailerons also result in drag that slows the aircraft and/or results in increased fuel consumption.

In the aspects described herein, aspects of aircraft operation are measured to accurately calculate the total mass of the aircraft and the aerodynamic forces exerted by the wings and elevators, and by the control surfaces thereon. The locations of centers of pressure for the aerodynamic forces are known and/or determinable. As a result, a location of the center of mass for the aircraft can be accurately calculated. The accurately-calculated location of the center of mass can be used to transfer fuel onboard the aircraft toward an aft-located fuel tank such that the center of mass of the aircraft can be moved toward an aft limit such that aerodynamic forces that the elevators have to impart are minimized. Moreover, the accurately-calculated location of the center of mass can be repeatedly calculated as fuel onboard the aircraft is transferred from a fuel tank on one side of the aircraft to an opposite side of the aircraft to eliminate any aerodynamic forces being imparted by the ailerons to maintain a level roll attitude.

Figure 1A:
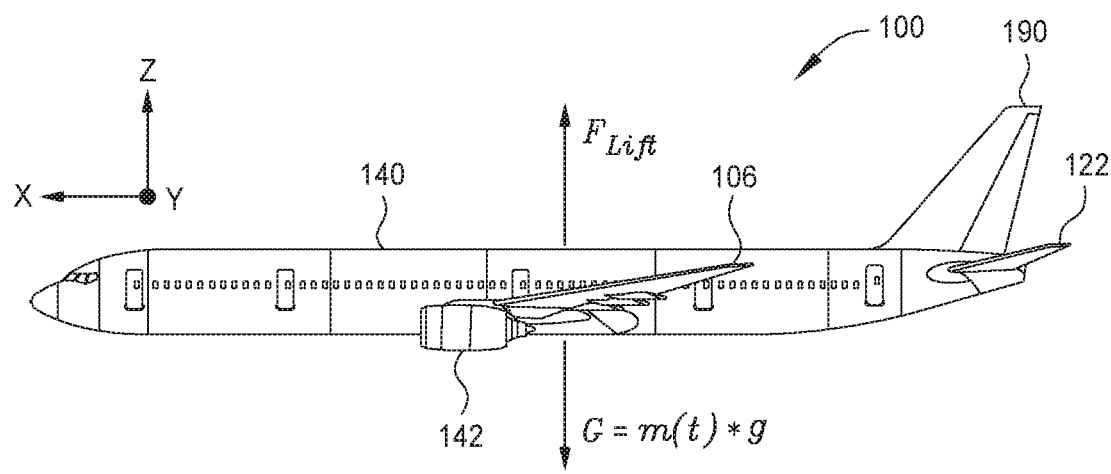
FIG. 1A is a side view of an aircraft in level flight, illustrating total lift and mass forces operating on the aircraft.

FIG. 1A is a side view of an aircraft 100 traveling in a straight and level attitude, meaning the aircraft 100 is not gaining or losing altitude and is not turning. In such a straight and level attitude, the lift force $F_{lift}$ generated by the aircraft 100 are equal to the gravity force G acting on the aircraft 100. The lift force $F_{lift}$ generated by the aircraft 100 is typically equal to the lift generated by the wings of the aircraft plus or minus any lift generated by the elevators. The gravity force G is defined by Equation (1):

$$G=m(t)*g, \qquad (1)$$

wherein g is the acceleration of gravity (approximately 9.81 m/s² or 32.2 ft/s² at the surface of the Earth) and m(t) is the total mass of the aircraft 100 at an instant of time. Over the course of a flight, the total mass of the aircraft 100 decreases as fuel is consumed by the engines. In the case of cargo aircraft, the total mass of the aircraft 100 may also decrease if cargo is released during flight. Moreover, military fuel tankers are capable of offloading fuel to other aircraft in flight such that the mass of the fuel tanker decreases as fuel is consumed by the tanker and as fuel is offloaded to other aircraft. Conversely, military aircraft that are capable of being refueled may increase in mass when receiving fuel from other aircraft (e.g., from fuel tankers).

For a frame of reference, FIG. 1A and other figures herein illustrate an X axis along a longitudinal axis of the aircraft 100, a Z axis that is orthogonal to the longitudinal axis and aligned with the rudder 190 of the aircraft, and a Y axis (in and out of the page in FIG. 1A) that is orthogonal to the longitudinal axis and to the Z axis. The arrows associated with the X axis, Y axis, and Z axis in the various figures denote a positive direction for the purposes of the equations described and discussed herein. However, such directionality is arbitrary and may be different in other aspects.

Figure 1B:
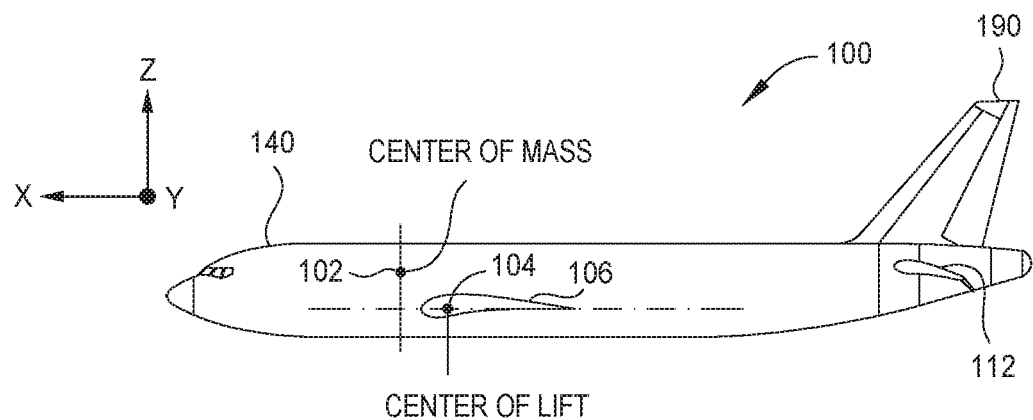
FIG. 1B is a schematic view of an aircraft, illustrating locations of a center of mass and a center of lift (i.e., center of pressure) for a wing of the aircraft.

As shown in FIG. 1A, lift force $F_{lift}$ generated by the aircraft and the gravity force G are aligned with and opposed to each other when the aircraft 100 is flying in a straight and level attitude. However, in reality, the lift forces generated by the wings (and elevators) of the aircraft 100 are not aligned with the center of mass of the aircraft 100. FIG. 1B illustrates a schematic side view of the aircraft of FIG. 1A and shows the location of the center of pressure 104 (also referred to as a center of lift) of the wing 106 of the aircraft 100 and also the center of mass (also referred to as a center of gravity) 102 of the aircraft 100. The center of pressure 104 is the location on the wing 106 where the total sum of the pressures on the wing 106 is acting. Stated differently, the center of pressure 104 is the point on the wing 106 where the total lift force of the wing can be considered to act. The location of the center of pressure 104 is determined through aircraft testing and/or computer modeling. The center of mass 102 is the location representing the mean position of all the mass of the aircraft 100. As shown in FIG. 1B, the center of mass 102 is positioned in front of the center of pressure 104 of the aircraft 100.

Figure 1C:
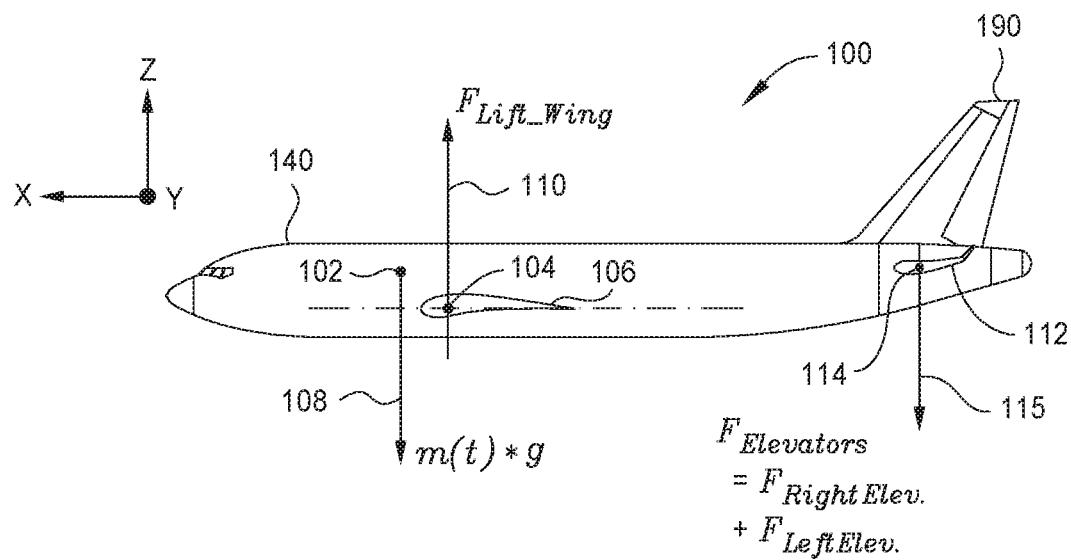
FIG. 1C is a schematic view of the aircraft of FIG. 1B, illustrating lift forces of wings of the aircraft and mass forces on the aircraft, and also illustrating aerodynamic forces from elevators of the aircraft input that counteract a pitching moment on the aircraft.

Referring to FIG. 1C, the gravity force G is exerted through the center of mass 102 (as indicated by arrow 108) and the lift force from the wing 106 $F_{Lift\_Wing}$ (indicated by arrow 110) is exerted through the center of pressure 104. The lift force from the wing 106 $F_{Lift\_Wing}$ is given by Equation (2):

$$F_{Lift\_Wing}=\tfrac{1}{2}\rho v^2 SC_L, \qquad (2)$$

wherein $\rho$ is air density, v is the true airspeed, S is the wing area, and $C_L$ is the lift coefficient at a given angle of attack, Mach number, and Reynolds number. The lift coefficient is known through aircraft testing, wind tunnel testing, and/or computer modeling of the wing 106 for the aircraft 100. For an aircraft, the lift coefficient can be simplified to being a function of the angle of attack and the Mach number, because the Reynolds number will primarily vary with airspeed.

As shown in FIG. 1C, the gravity force G is exerted at a location along the longitudinal axis that is forward of the location at which the lift force from the wing 106 $F_{Lift\_Wing}$ is exerted. The dissimilar locations of the two forces results in a pitching moment that urges the nose of the aircraft downward. Additionally, the shape of the wing 106 may impart an additional moment that adds to or subtracts from the pitching moment. The moment M imparted by the shape of the wing 106 is given by Equation (3):

$$M = C_m \times q \times S \times c, \quad (3)$$

wherein $C_m$ is the pitching moment coefficient for the wing 106, q is the dynamic pressure, S is the area of the wing 106, and c is the length of the chord of the wing 106. The dynamic pressure q is given by Equation (4):

$$q = \frac{1}{2} \rho u^2 \quad (4)$$

wherein ρ is the air density and u is the flow speed of air relative to the wing. The pitching moment coefficient $C_m$ of the wing 106 is known through aircraft testing and/or computer modeling. Additionally, the flow speed of air and air density can be measured using avionics equipment, such as a pitot static tube, in combination with test data and/or computer modeling. To counteract the pitching moment M of the wing 106 and the pitching moment of the forward-located gravity force G, elevators 112 of the aircraft 100 impart a lift force $F_{Elevators}$ (indicated by arrow 115). The elevator lift force $F_{Elevators}$ includes a lift component from the right elevator $F_{RightElev.}$ and a lift component from the left elevator $F_{LeftElev.}$ in accordance with Equation (5):

$$F_{Elevators} = F_{RightElev.} + F_{LeftElev.} \quad (5)$$

The lift components from the right elevator $F_{RightElev.}$ and the left elevator $F_{LeftElev.}$ may differ, e.g., due to rigging tolerances of control surfaces 122 of the elevators 112, and such rigging differences may be detectable by sensors operable to measure positions of the control surfaces 122. The lift generated by the elevators 112 is known from aircraft test data and/or computer modeling. For example, the lift generated by the elevators may be a function of airspeed, pitch attitude of the aircraft, and angular displacement of the control surfaces 122 of the elevators 112.

Figure 1D:
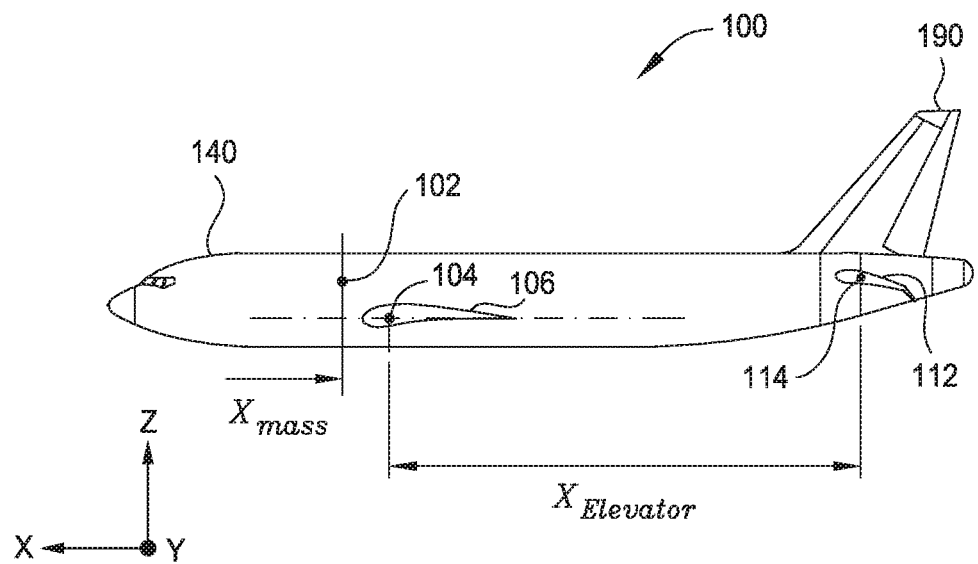
FIG. 1D is a side view of the aircraft of FIG. 1B, illustrating distances along a longitudinal axis from the center of pressure of the wing to the center of mass and from the center of pressure of the elevator.

Referring to FIG. 1D, the aircraft 100 can be thought of as a lever pivoting about a fulcrum located at the center of pressure 104. A distance from the gravity force G to the center of pressure 104 of the wing 106 is a first distance $x_{mass}$ and a distance from a center of pressure 114 of the elevators 112 to the center of pressure 104 of the wing 106 is a second distance $x_{Elevator}$. The gravity force G exerts a moment (i.e., torque) about the center of pressure 104 of the wing 106 equal to $m(t) \times g \times x_{mass}$. The elevator lift force $F_{Elevators}$ exerts a moment about the center of pressure 104 of the wing 106 equal to $F_{Elevators} \times x_{Elevator}$. When the aircraft is flying at a constant pitch attitude, the elevator lift force $F_{Elevators}$ is such that the moment exerted by the elevators 112 is equal to the moment exerted by the gravity force G plus any moment M resulting from the shape of the wing 106. Stated differently, the elevator lift force $F_{Elevators}$ is equal to a value that satisfies Equation (6a):

$$F_{Lift\_Wing} \times 0 - m(t) \times g \times x_{mass} - M + F_{Elevators} \times x_{Elevators} = 0. \quad (6a)$$

The moments are being calculated with respect to the center of pressure 104 of the wing 106. Therefore, the moment arm for the lift $F_{Lift\_Wing}$ is from the wing 106 is equal to zero, and that term can be ignored. Moreover, since the moment M from the shape of the wing 106 is determined by other factors (e.g., airspeed and air density), it can be considered a constant that can be ignored for the purposes of this discussion. Therefore, Equation (6a) can be simplified to Equation (6b):

$$-m(t) \times g \times x_{mass} + F_{Elevators} \times x_{Elevators} = 0. \quad (6b)$$

Equation (6b) can be rewritten as Equation (6c) to solve for $x_{mass}$:

$$x_{mass} = \frac{F_{Elevators} \times x_{Elevators}}{-m(t) \times g}. \quad (6c)$$

Using Equation (6c), the location of the center of mass $x_{mass}$ relative to the known location of the center of pressure 104 of the wing 106 can be calculated based on the known mass m(t) of the aircraft and the elevator lift force $F_{Elevators}$.

Figure 1E:
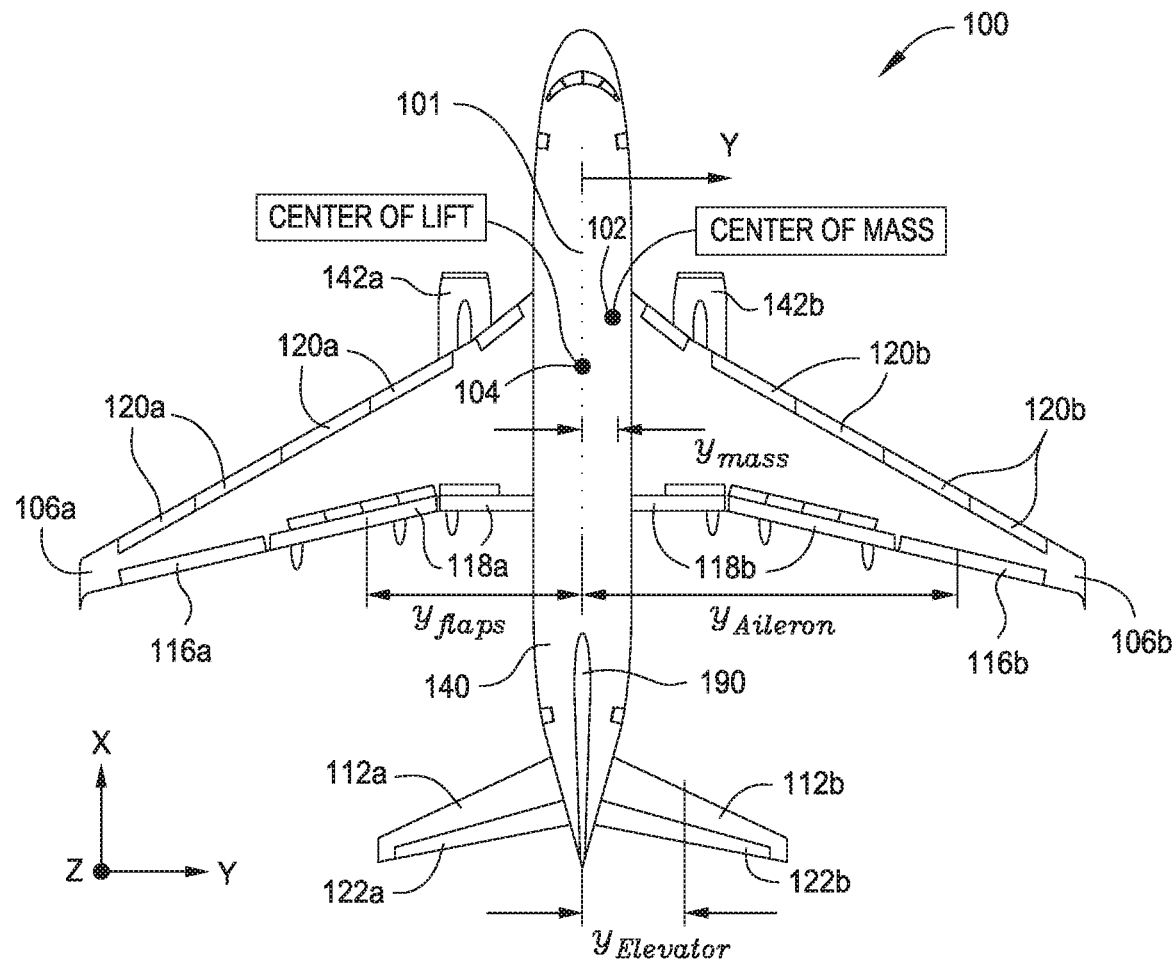
FIG. 1E is a top view of the aircraft of FIG. 1B, illustrating distances along a lateral axis from a centerline of the aircraft to the center of mass and to control surfaces of the aircraft.

A lateral position of the center of mass 102 can also be determined in a similar manner. FIG. 1E is a top schematic view of the aircraft 100 and illustrates the center of mass 102 displaced from a centerline of the aircraft 100 by a distance $y_{mass}$. Differential lateral forces may be applied by three different control surfaces. As discussed above, control surfaces 122 of the elevator 112 may be positioned differently due to rigging tolerances. In some aircraft (e.g., fighter aircraft), the control surfaces 122 of the elevators 112 may be positioned differently to provide additional roll authority about the longitudinal axis. The ailerons 116a and 116b (i.e., control surfaces) on the left wing 106a and the right wing 106b are also configured to be positioned differently (e.g., one aileron goes up and the other aileron goes down) to provide roll authority about the longitudinal axis. Finally, the flaps 118a and 118b and/or slats 120a and 120b (i.e., control surfaces) may be deployed or retracted slightly differently due to rigging tolerances. The aircraft 100 can include sensors to detect the positions of the various control surfaces as well as any differences in positions due to rigging. As a result, the forces exerted by the control surfaces (including any differential forces) can be calculated.

Figure 1F:
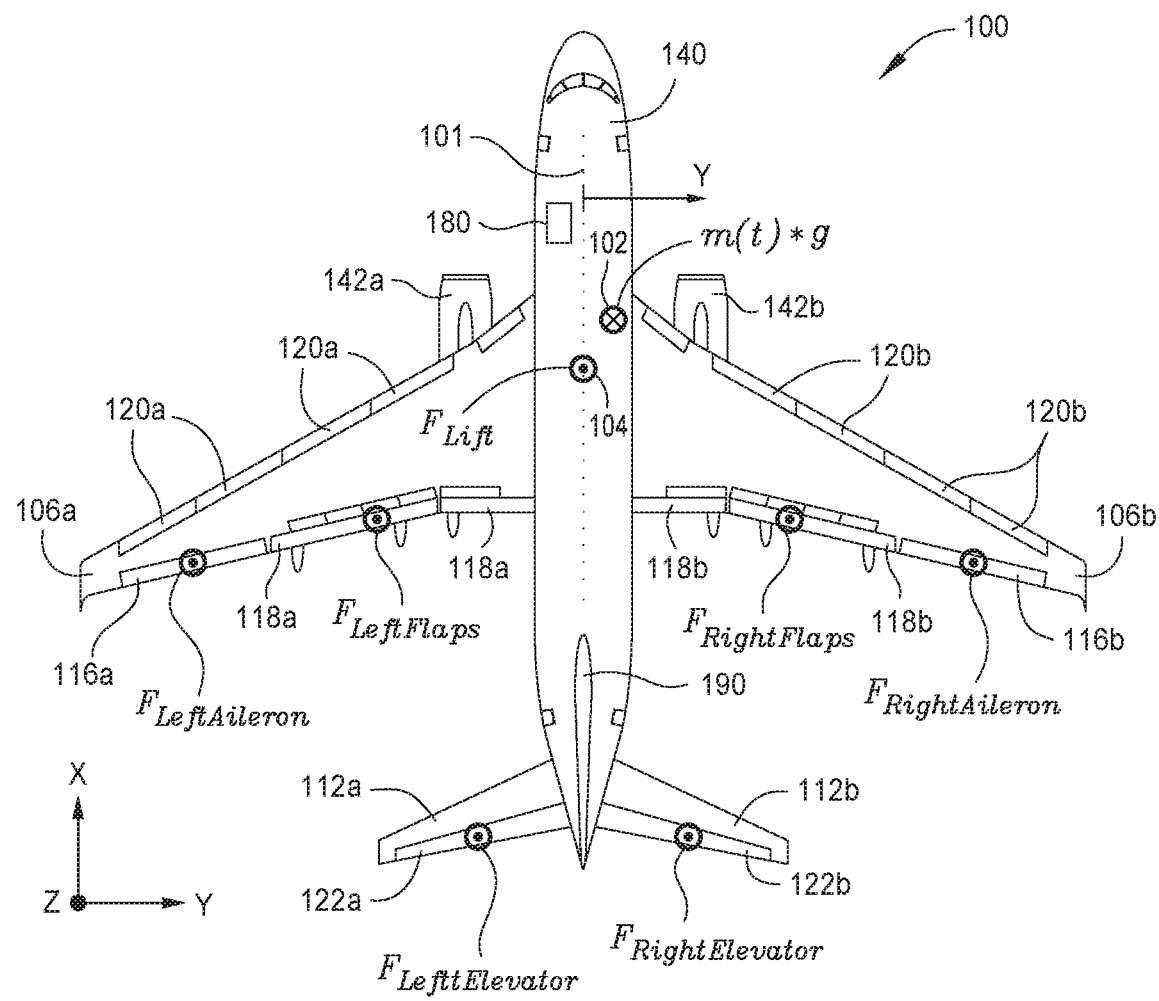
FIG. 1F is a top view of the aircraft of FIG. 1B, illustrating centers of pressure for aerodynamic forces from the control surfaces.

Referring to FIG. 1F, the various control surfaces exert forces that result in moments about the longitudinal axis. As discussed above, the left elevator 112a includes a left control surface 122a, and the force from the left elevator $F_{LeftElev.}$ depends on the displacement or position of the left control surface 122a. Likewise, the right elevator 112b includes a right control surface 122b, and the force from the right elevator $F_{RightElev.}$ depends on the displacement or position of the right control surface 122b. In the event the control surfaces 122a and 122b of the left and right elevators 112a and 112b are rigged differently (e.g., due to tolerances) or are purposely deflected differently, then a differential elevator force $F_{DiffElev.}$ is generated in accordance with Equation (7):

$$F_{DiffElev.} = F_{RightElev.} - F_{LeftElev.} \quad (7)$$

The left wing 106a includes the left aileron 116a (i.e., control surface), and the force $F_{LeftAileron}$ from the left aileron 116a depends on the displacement or position of the left aileron 116a. The right wing 106b includes the right aileron 116b (i.e., control surface), and the force $F_{RightAileron}$ from the right aileron 116b depends on the displacement or position of the left aileron 116b. As discussed above, the ailerons 116 are operated in opposite manners to generate opposing forces to cause the aircraft 100 to roll about its longitudinal axis. The resulting differential aileron force $F_{DiffAileron}$ is generated in accordance with Equation (8):

$$F_{DiffAileron} = F_{RightAileron} - F_{LeftAileron}. \quad (8)$$

The left wing 106a also includes left flaps 118a and/or left slats 120a that are deployable to generate extra lift $F_{LeftFlaps}$ at slower speeds (e.g., during takeoff and on approach to landing). The right wing 106b also includes right flaps 118b and/or left slats 120b that are deployable to generate extra lift $F_{RightFlaps}$ at slower speeds (e.g., during takeoff and on approach to landing). The amount of extra lift generated by the flaps 118 and slats 120 depends on the degree of deployment and is determinable through wind tunnel testing, computer modeling, and/or flight testing. The flaps 118 and slats 120 are intended to deploy and retract to the same degree on both sides, but may deploy and retract to different positions due to rigging tolerances. In the event the flaps 118 and/or slats 120 are rigged differently, then a differential flaps force $F_{DiffFlaps}$ is generated in accordance with Equation (9):

$$F_{DiffFlaps} = F_{RightFlaps} - F_{LeftFlaps}. \tag{9}$$

The differential forces of the elevator control surfaces 122, ailerons 116, and flaps 118 and/or slats 120 exert moments about respective centers of pressure in the lateral direction. Referring again to FIG. 1E, the differential elevator force $F_{DiffElev.}$ is exerted at a center of pressure located a distance $y_{Elevator}$ from the longitudinal axis 101 (e.g., centerline) of the aircraft 100. The differential aileron force $F_{DiffAileron}$ is exerted at a center of pressure located a distance $y_{Aileron}$ from the longitudinal axis 101. The differential flaps force $F_{DiffFlaps}$ is exerted at a center of pressure located a distance $y_{Flaps}$ from the longitudinal axis 101. As illustrated in FIG. 1E, the center of pressure 104 of the wings 106 lies on the centerline of the aircraft 100. Therefore, during straight and level flight, the forces generated by the control surfaces are in accordance with Equation (10a):

$$F_{Lift\_Wing} \times 0 - m(t) \times g \times y_{mass} + F_{DiffElev.} \times y_{Elevator} + F_{DiffAileron} \times y_{Aileron} + F_{DiffFlaps} \times y_{Flaps} = 0. \tag{10a}$$

As above with respect to the moments in the longitudinal direction, the moment arm for the lift from the wings $F_{Lift\_Wing}$ is equal to zero such that the term "$F_{Lift\_Wing} \times 0$" can be omitted. The resulting equation can be rewritten as Equation (10b) to solve for the lateral location of the center of mass $y_{mass}$:

$$y_{mass} = \frac{F_{DiffElev.} \times y_{Elevator} + F_{DiffAileron} \times y_{Aileron} + F_{DiffFlaps} \times y_{Flaps}}{m(t) \times g}. \tag{10b}$$

Using Equation (10b), the lateral location of the center of mass $y_{mass}$ relative to the centerline of the aircraft 100 can be calculated based on the known mass m(t) of the aircraft and the differential forces of the control surfaces 116, 118, 120, and/or 122.

Figure 1G:
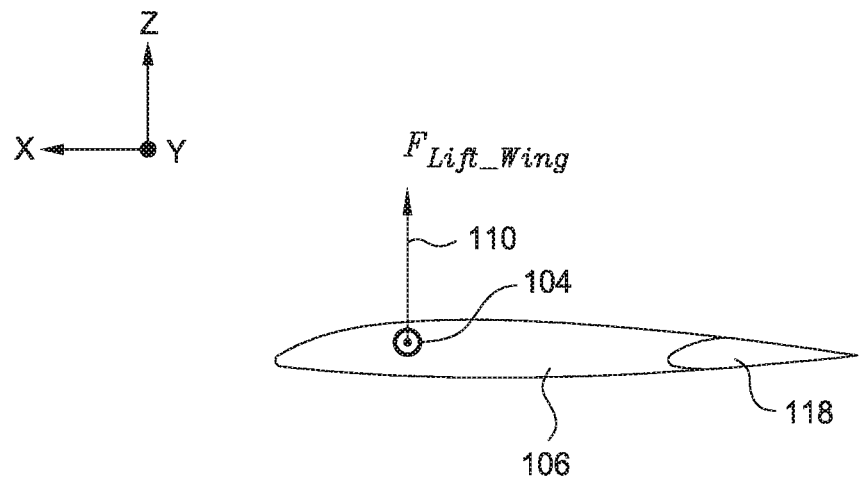
FIG. 1G is a side schematic view of the wing of the aircraft of FIG. 1B, wherein the flap is illustrated in a retracted position and the center of pressure of the wing is in a first location.
Figure 1H:
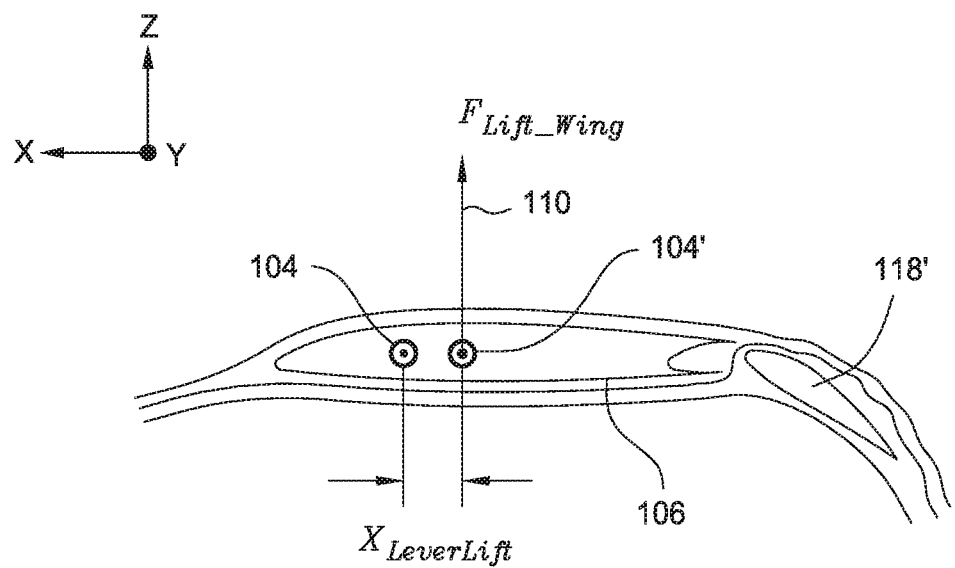
FIG. 1H is a side schematic view of the wing of FIG. 1G, wherein the flap is illustrated in a deployed position and the center of pressure of the wing is in a second location.

In the discussions above, it is assumed that the location of the center of pressure 104 of the wing 106 remains the same. However, that is not necessarily the case. In some instances, the location of the center of pressure 104 of the wing 106 along the longitudinal axis may change based on airspeed and angle of attack of the wing 106, for example. Additionally, the deployment of flaps 118 and/or slats 120 may affect the location of the center of pressure. FIGS. 1G and 1H are schematic side views of a wing 106 of the aircraft 100 with the flap 118 in a stowed position and a deployed configuration, respectively. In the deployed position, the flap 118 has moved in an aft direction and also pivoted downwardly into the airflow. The deployed flap 118' generates higher pressures on the bottom surface than the stowed flap 118. As a result, the center of pressure 104' has shifted aft along the wing 106 by an amount $x_{LeverLift}$. The location of the center of pressure 104 and variations thereof are known based on aircraft testing and/or computer modeling and can therefore be accounted for in the above-described equations. For example, the known amount $x_{LeverLift}$ can be added to $x_{mass}$ and subtracted from $x_{elevator}$ to account for changes in the center of pressure 104 of the wing 106.

As discussed above, the mass m(t) of the aircraft 100 can be calculated during flight. The mass m(t) at any given time is equal the empty weight of the aircraft plus the weight of fuel, passengers, and cargo. The starting mass of the aircraft can be determined by one of several different methods. For example, according to one method, the mass m(t) of the aircraft 100 can be determined based on a measured amount of force exerted by a pushback vehicle and a resulting measured acceleration of the aircraft 100. Such a method is described in U.S. application Ser. No. 15/441,436, the entire contents of which are incorporated by reference in their entirety herein. Thereafter, the total mass m(t) of the aircraft 100 at any time after engine start can be calculated according to Equation (11):

$$m(t) = m_{atPushback} - \int_{Time\,at\,Pushback}^{Current\,Time} \dot{m}_{FuelFlow}(t)dt, \tag{11}$$

wherein $m_{atPushback}$ is the total mass of the aircraft at pushback and $\dot{m}_{FuelFlow}(t)$ is the mass flow rate of fuel to the engines over time. For example, the mass flow rate is relatively low when the engines are at idle and relatively high when the engines are generating takeoff power. By integrating on the mass flow rate over time during a flight, the mass of fuel consumed by the engines can be calculated and subtracted from the total mass of the aircraft at pushback to identify the current total mass of the aircraft. As discussed above, in certain circumstances, an aircraft may release cargo, offload fuel, or receive fuel in mid-air. Such mass changes can be accounted for in Equation (11) by subtracting discrete amounts of mass corresponding to the mass of the cargo offloaded or the mass of fuel offloaded or received.

Figure 2A:
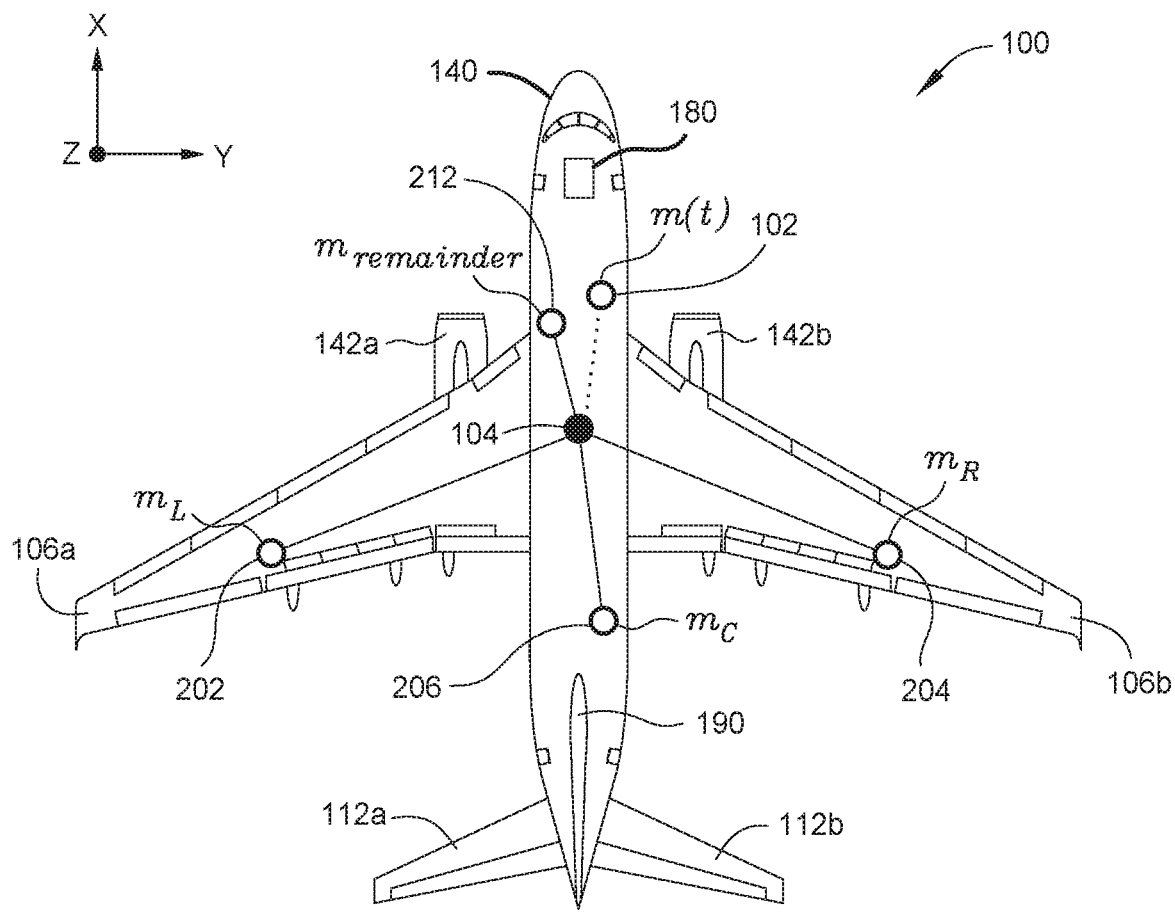
FIG. 2A is a top schematic view of the aircraft of FIG. 1B, wherein locations of centers of mass for fuel tanks, a remainder mass (i.e., the empty mass of the aircraft, the weight of the passengers, and the weight of the cargo), and a total mass of the aircraft.
Figure 2B:
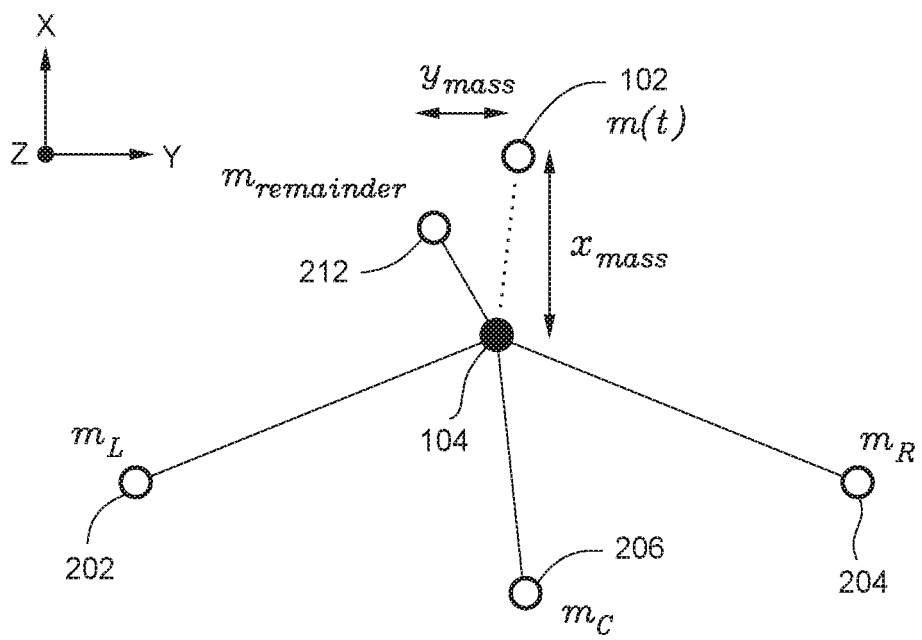
FIG. 2B is a schematic view of the centers of mass of FIG. 2A, wherein distances of the centers of mass from the center of pressure of the wing of the aircraft are shown.

Referring to FIGS. 2A and 2B, with the total mass m(t) and the locations $x_{mass}$ and $y_{mass}$ of the center of mass 102 of the total mass m(t) known, the center of mass of the remainder of the aircraft 100 (i.e., the empty weight of the aircraft 100, the weight of the passengers, and the weight of any cargo) $m_{remainder}$ 212 can be determined. The location of the center of mass 102 of the total mass m(t) is based on a mass-weighted summation of moments resulting from the locations of the components of mass that make up the total mass m(t). For the aircraft 100 shown in FIGS. 2A and 2B, the components of mass include the mass of fuel $m_L$ in a left fuel tank 202, the mass of fuel $m_R$ in a right fuel tank 204, the mass of fuel $m_C$ in a center fuel tank 206, and the mass of the remainder of the aircraft 100 $m_{remainder}$ 212. Referring primarily to FIG. 2B, each of the above-described mass components includes a center of mass located relative to the center of pressure 104 of the wing 106. FIG. 2B shows the total mass m(t) located at the longitudinal and lateral distances $x_{mass}$ and $y_{mass}$ calculated above. The location of the center of mass ($x_L$, $y_L$) of the left fuel tank 202, the location of the center of mass ($x_R$, $y_R$) of the right fuel tank 204, and the center of mass ($x_C$, $y_C$) of the center fuel tank 206 are known, based on the aircraft design. The masses of fuel $m_R$, $m_L$, and $m_C$, are also known based on fuel measurements of the fuel tanks. Therefore, the mass of the remainder of the aircraft 100 $m_{remainder}$ 212 can be calculated according to Equation (12):

$$m_{remainder} = m(t) - m_L - m_R - m_C. \tag{12}$$

Based on the above, the mass balance in the direction of the longitudinal axis is given by Equation (13a):

$$x_{mass} \times m(t) = m_L \times x_L + m_R \times x_R + m_C \times x_C + m_{remainder} \times x_{remainder}. \quad (13a)$$

All of the variable in Equation (13a) are known, except for the location of the center of mass in the longitudinal direction for the mass of the remainder of the aircraft 100 $m_{remainder}$ 212 ($x_{remainder}$). Therefore, Equation (13a) can be rewritten as Equation (13b) to solve for $x_{remainder}$:

$$x_{remainder} = \frac{x_{mass} \times m(t) - m_L \times x_L - m_R \times x_R - m_C \times x_C}{m_{remainder}}. \quad (13b)$$

Additionally, the mass balance in the lateral direction is given by Equation (14a):

$$y_{mass} \times m(t) = m_L \times y_L + m_R \times y_R + m_C \times y_C + m_{remainder} \times y_{remainder}. \quad (14a)$$

Again, all of the variable in Equation (14a) are known, except for the location of the center of mass in the lateral direction for the mass of the remainder of the aircraft 100 $m_{remainder}$ 212 ($y_{remainder}$). Therefore, Equation (14a) can be rewritten as Equation (14b) to solve for $y_{remainder}$:

$$y_{remainder} = \frac{y_{mass} \times m(t) - m_L \times y_L - m_R \times y_R - m_C \times y_C}{m_{remainder}}. \quad (14b)$$

Figure 2C:
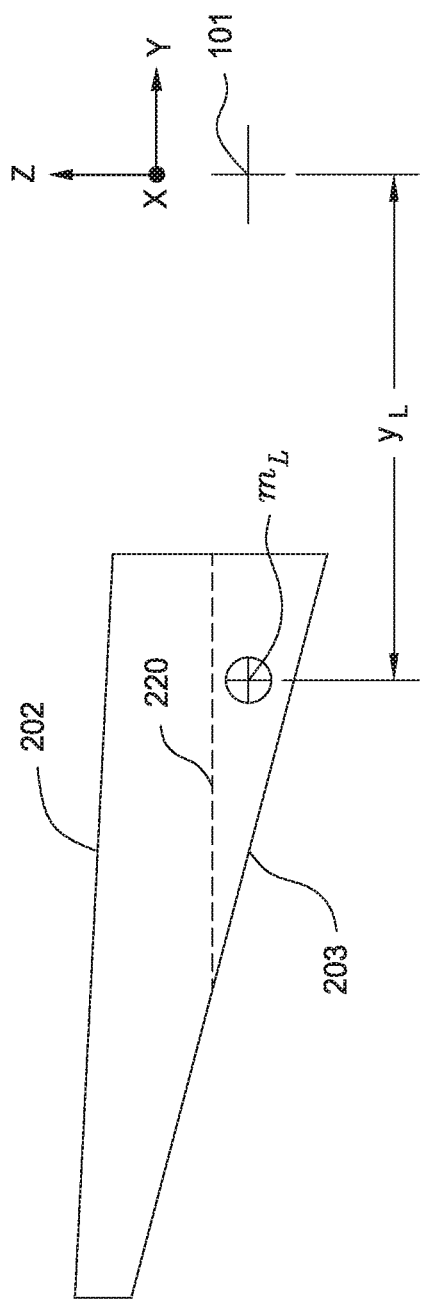
FIG. 2C is an end view of a fuel tank in the left wing of the aircraft of FIG. 1B, wherein the fuel tank contains a first mass of fuel and has a corresponding first center of mass relative to the lateral axis of the aircraft.
Figure 2D:
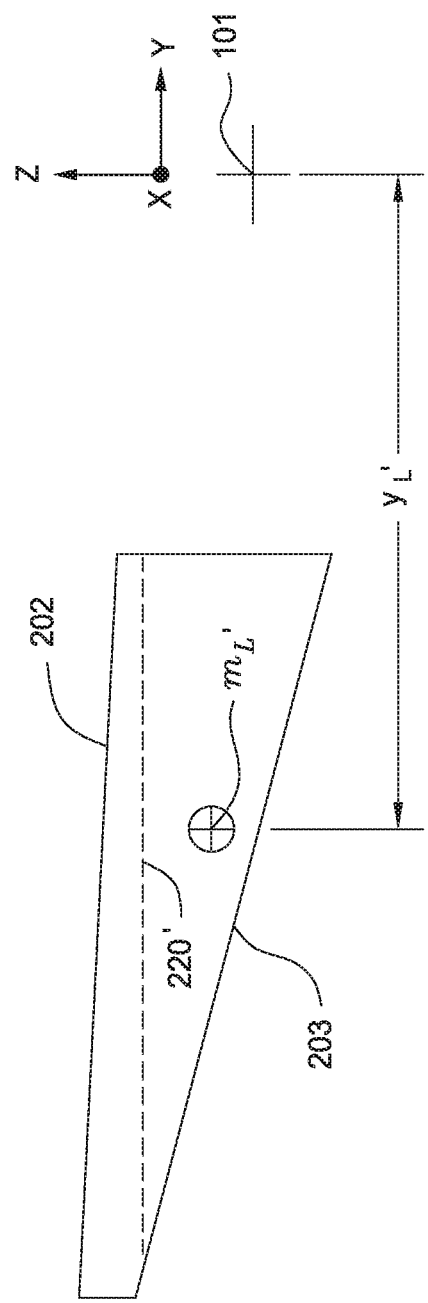
FIG. 2D is an end view of the fuel tank of FIG. 2C, wherein the fuel tank contains a second mass of fuel and has a corresponding second center of mass relative to the lateral axis of the aircraft.

In some circumstances, the locations of the centers of mass of the fuel tanks may change depending on the amount of fuel contained in the fuel tanks. FIGS. 2C and 2D are schematic end views of the left fuel tank 202 of the left wing 106 of the aircraft 100. The left fuel tank 202 is illustrated as having an inclined bottom surface 203. For example, the wings 106 of the aircraft 100 may have a dihedral angle such that the wing tips are higher than the wing roots, and the inclined bottom surface 203 of the left fuel tank 202 conforms to a lower surface of the left wing 106a. In FIG. 2C, the left fuel tank 202 includes a first quantity of fuel 220 (the top of the fuel is denoted by broken line). In FIG. 2C, the left fuel tank 202 includes a second quantity of fuel 220' that is greater than the first quantity. As the fuel quantity in the left fuel tank 202 increases, the top of the fuel 220 extends further from the center of pressure 104 of the wing 106 along the inclined bottom surface 203. Moreover, as the water line of the fuel 220 extends along the inclined bottom surface 203 of the left fuel tank 202, the center of mass $y_L$ of the fuel contained in the left fuel tank 202 moves away from the center of pressure 104. Accordingly, the first quantity of fuel 220 illustrated in FIG. 2C has a center of mass $y_L$ that is closer to the center of pressure 104 than the center of mass $y_L'$ of the second quantity of fuel 220' illustrated in FIG. 2D.

Figure 2E:
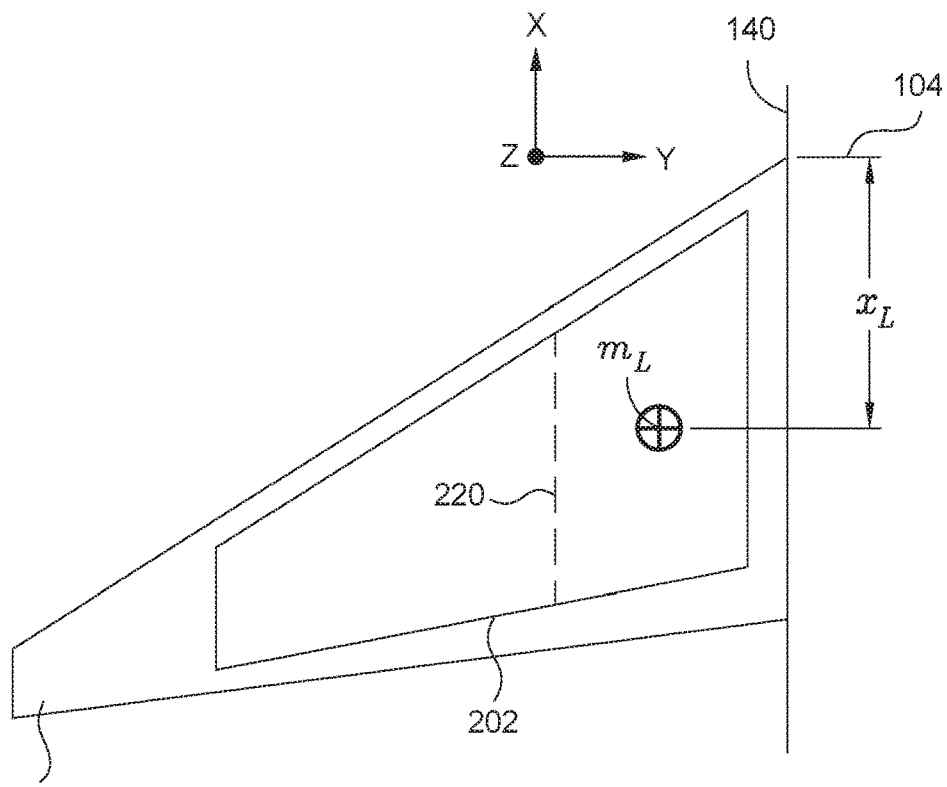
FIG. 2E is a top view of the fuel tank of FIG. 2C, wherein the fuel contains the first mass of fuel and has a corresponding first center of mass relative to the longitudinal axis of the aircraft.
Figure 2F:
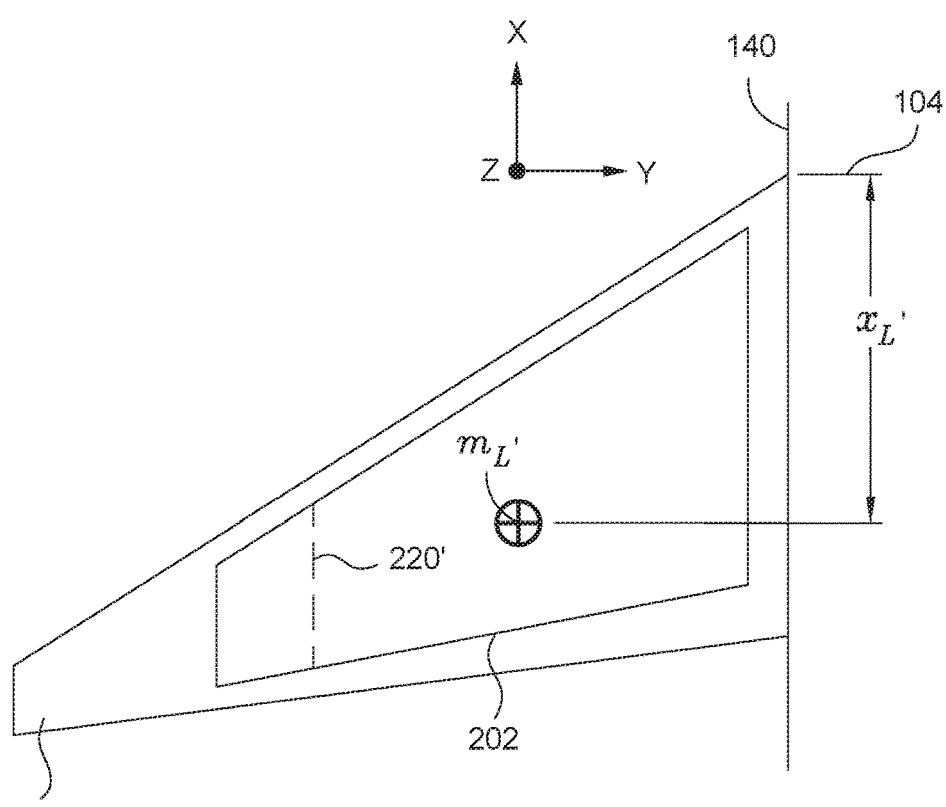
FIG. 2F is a top view of the fuel tank of FIG. 2C, wherein the fuel contains the second mass of fuel and has a corresponding second center of mass relative to the longitudinal axis of the aircraft.

Likewise, the locations of the centers of mass of the fuel tanks may change in the longitudinal direction depending on the amount of fuel contained in the fuel tanks. FIGS. 2E and 2F are schematic top views of the left fuel tank 202 of the left wing 106 of the aircraft 100. The left fuel tank 202 is illustrated as being oriented in an aft direction at greater distances from the fuselage 140 of the aircraft 100. For example, the left wing 106a is illustrated as being swept back, and the skewed shape of the left fuel tank 202 conforms to the swept back leading and trailing edges of the left wing 106a. As shown in FIG. 2E, when the left fuel tank 202 includes the first quantity of fuel 220, the fuel is contained within a forward portion of the left fuel tank 202. As a result, the location of the center of mass in the longitudinal direction $x_L$ is a first distance from the center of pressure 104 of the wing 106. As shown in FIG. 2F, when the left fuel tank 202 includes the second, greater quantity of fuel 220, the fuel has extended toward a rear portion of the left fuel tank 202. As a result, the location of the center of mass in the longitudinal direction $x_L'$ is a second distance from the center of pressure 104 of the wing 106, which is greater than the first distance.

In addition to changing locations of centers of mass of fuel in the fuel tanks based on fuel quantity, the locations of the centers of mass of fuel in the fuel tanks may change based on aircraft orientation. For example, at higher nose-high pitch angles, the fuel in the fuel tanks may shift rearward. Accordingly, the centers of mass of fuel in the fuel tanks may also shift rearward. As another example, during a turn, the fuel may shift laterally. For example, if the aircraft 100 is banked to the right, then the locations of the centers of mass of fuel in the left fuel tank 202, right fuel tank 204, and center fuel tank 206 may also shift to the right. The locations of the centers of mass of fuel in the fuel tanks for various quantities of fuel and/or aircraft orientation is known from design data. For example, data on the locations of centers of mass of fuel in the fuel tanks based on fuel quantity and/or aircraft orientation may be stored in a lookup table for use in the above-described calculations associated with Equations (13) and (14).

Based on Equations (6c) and (10b), above, fuel can be transferred such that the center of mass 102 moves toward an aft limit for the center of mass 102 of the aircraft. As discussed above, arranging the location of the center of mass on the aft limit of the center of mass minimizes the distance of the center of mass 102 from the center of pressure 104, thereby reducing the moment that is counteracted by the elevators. As a result, the forces exerted by the elevators is also decreased. Generally, the center fuel tank 206 is positioned aft of the possible locations of the center of mass 102 of the aircraft 100 such that transferring fuel from the left and right fuel tanks 202 and 204 to the center fuel tank 206 results in the location of the center of mass 102 moving aft. Also, transferring fuel from the left fuel tank 202 to the center fuel tank 206 and/or the right fuel tank 204 moves the location of the center of mass 102 toward the right side of the aircraft 100. Finally, transferring fuel from the right fuel tank 204 to the center fuel tank 206 and/or the left fuel tank 202 moves the location of the center of mass 102 toward the left side of the aircraft 100. Consequently, equations (6c) and (10b) can be continuously recalculated as fuel is incrementally transferred between the fuel tanks 202, 204, and 206 until the calculated location of the center of mass 102 is positioned on the centerline and at the aft limit for the center of mass 102.

In one aspect, amounts of fuel to transfer from at least one of the fuel tanks 202, 204, and 206 to other ones of the fuel tanks 202, 204, and 206 can be calculated by using the results of Equations (12) and (13a). Specifically, with respect to the center of mass in the longitudinal direction, the goal is to position the center of mass $x_{mass}$ at the location of the aft limit (AL) for the center of mass 102 for the aircraft 100. The aft center of mass limit AL is an aft-most position for the center of mass 102 at which the aircraft 100 exhibits acceptable handling characteristics. Generally, the aft limit AL is expressed as a distance from the center of pressure 104 for the wing 106. Stated differently, the goal is for $x_{mass}$ to be equal to AL. In one aspect, the location of the center of mass $x_{mass}$ is moved toward the location of the aft limit AL by moving equal amounts from fuel from each of the left fuel tank 202 and the right fuel tank 204 to the center fuel tank 206 in accordance with Equations (15) and (16):

$$\Delta m_C = \Delta m_L + \Delta m_R; \text{ and} \tag{15}$$

$$\Delta m_L = \Delta m_R. \tag{16}$$

Based on the above, the amount of fuel to be transferred to the center fuel tank 206 to move the location of the center of mass $x_{mass}$ to the location of the aft limit AL is given by Equation (17a):

$$x_{mass} = AL = \frac{(m_L - \Delta m_L) \times x_L + (m_R - \Delta m_R) \times x_R + (m_c + \Delta m_c) \times x_C + m_{remainder} \times x_{remainder}}{m(t)}, \tag{17a}$$

which can be simplified by replacing each of $\Delta m_L$ and $\Delta m_R$ with ½$\Delta m_c$ and rearranged to solve for $\Delta m_C$ to result in Equation (17b):

$$\Delta m_c = \frac{AL \times m(t) - m_L \times x_L - m_R \times x_R - m_C \times x_C - m_{remainder} \times x_{remainder}}{x_c - \frac{1}{2}x_L - \frac{1}{2}x_R}. \tag{17b}$$

Again, the result $\Delta m_C$ provides an amount of fuel to transfer to the center fuel tank to move the location of the center of mass $x_{mass}$ to the location of the aft limit.

In a similar manner, an amount of fuel to transfer from the left fuel tank to the right fuel tank or vice versa to move the location of the center of mass $y_{mass}$ to the centerline of the aircraft 100 can be calculated by using the results of Equations (12) and (14a). The goal is for $y_{mss}$ to be equal to 0. By moving fuel from the left fuel tank to the right fuel tank or vice versa, the relationship of Equation (16) holds true. Based on Equation (14a), the amount of fuel to be transferred to the left fuel tank 202 from the right fuel tank 204 to move the location of the center of mass $y_{mass}$ to the centerline is given by Equation (18a):

$$y_{mass} = 0 = \frac{(m_L + \Delta m_L) \times y_L + (m_R - \Delta m_R) \times y_R + m_C \times y_c + m_{remainder} \times y_{remainder}}{m(t)}. \tag{18a}$$

In the case fuel is to be transferred to the right fuel tank 204 from the left fuel tank 202, then Equation (18b) applies:

$$y_{mass} = 0 = \frac{(m_L - \Delta m_L) \times y_L + (m_R + \Delta m_R) \times y_R + m_C \times y_c + m_{remainder} \times y_{remainder}}{m(t)}, \tag{18b}$$

in which the signs associated with $\Delta m_L$ and $\Delta m_R$ have been switched. As discussed above, $\Delta m_L$ and $\Delta m_R$ are equal, such that $\Delta m_L$ could be changed to $\Delta m_R$ or vice versa. Similarly, $\Delta m_L$ and $\Delta m_R$ could be changed to a generic variable $\Delta m_y$. Based on the above, Equation (18a) can be rewritten as Equation (18c):

$$\Delta m_y = \frac{-m_L \times y_L - m_R \times y_R - m_C \times y_C - m_{remainder} \times y_{remainder}}{y_L - y_R}. \tag{18c}$$

Similarly, Equation (18b) can be rewritten as Equation (18d):

$$\Delta m_y = \frac{-m_L \times y_L - m_R \times y_R - m_C \times y_C - m_{remainder} \times y_{remainder}}{y_R - y_L}. \tag{18d}$$

The use of Equation (18c) or Equation (18d) depends on whether the center of mass $y_{mass}$ is to the left or to the right of the centerline of the aircraft 100. The location of the center of mass $y_{mass}$ to the left or to the right of the centerline of the aircraft 100 is detectable based on the positions of the ailerons 116a and 116b, for example. If the left aileron 116a is exerting a constant downward force (i.e., $F_{LeftAileron}$) to maintain a level attitude, then the location of the center of mass $y_{mass}$ is to the left of the centerline of the aircraft 100. As a result, Equation (18d) can be used to determine the mass of fuel to transfer from the left fuel tank 202 to the right fuel tank 204. If the right aileron 116b is exerting a constant downward force (i.e., $F_{RightAileron}$) to maintain a level attitude, then the location of the center of mass $y_{mass}$ is to the right of the centerline of the aircraft 100. As a result, Equation (18c) can be used to determine the mass of fuel to transfer from the right fuel tank 204 to the left fuel tank 202.

In some instances, it may not be possible to transfer the calculated amount of fuel $\Delta m_c$ or $\Delta m_y$ to the designated fuel tank. For example, a calculation according to Equation (17b) may indicate that 500 pounds of fuel $\Delta m_c$ is to be transferred to the center fuel tank 206 to move the location of the center of mass $x_{mass}$ to the aft limit AL. However, in this scenario, the center fuel tank 206 only has enough empty space to transfer 300 pounds of fuel thereto. In such a circumstance, only 300 pounds of fuel is transferred to the center fuel tank 206 (150 pounds from the left fuel tank 202 and 150 pounds from the right fuel tank 204). At a later time, after additional fuel is consumed from the center fuel tank 206, additional fuel can be transferred to the center fuel tank 206.

Figure 3:
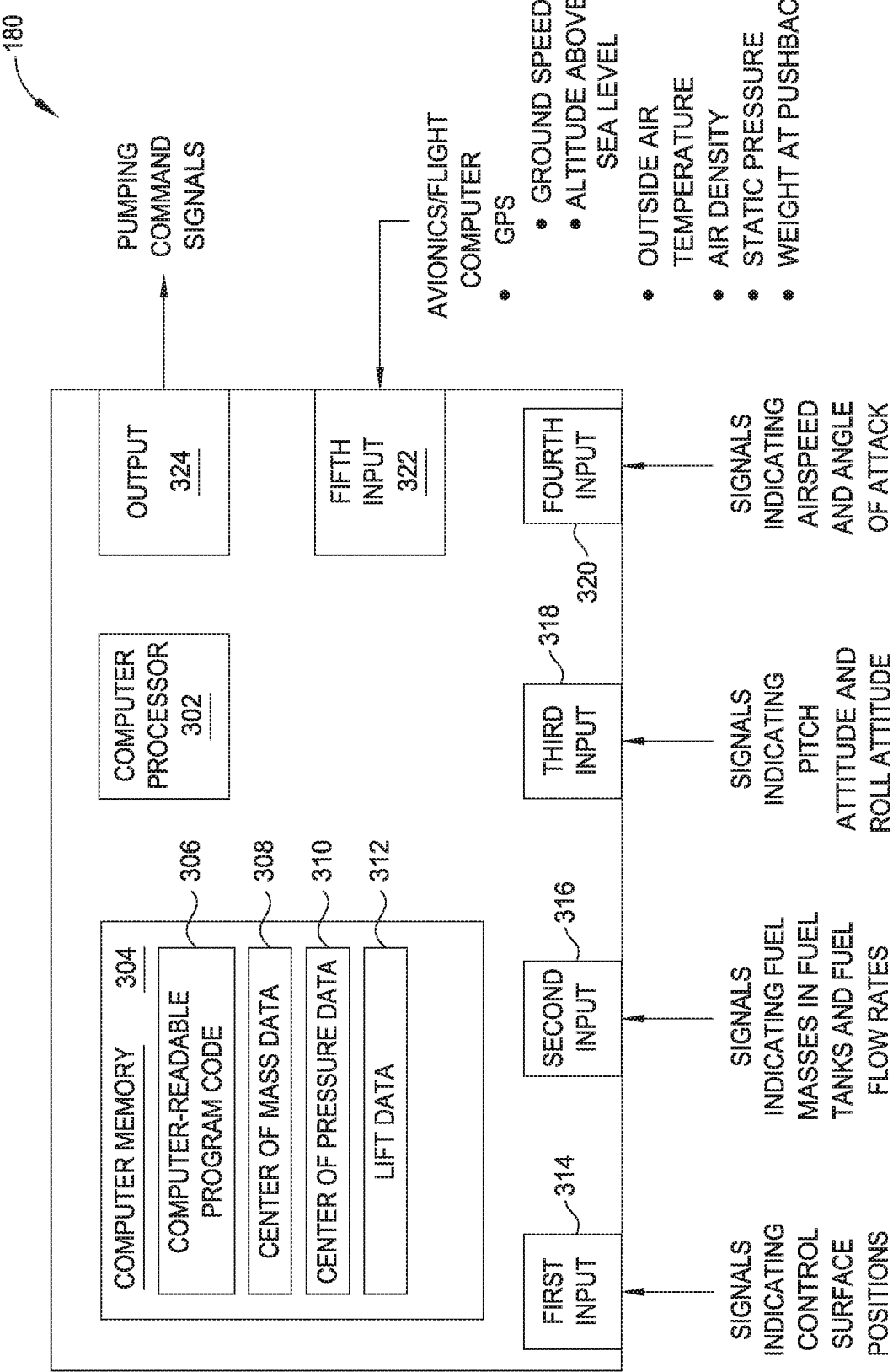
FIG. 3 is a block diagram of a controller, according to one aspect, for detecting a center of mass of the aircraft and transferring fuel to change the center of mass.

In at least one aspect, the aircraft 100 includes a controller 180 that performs the above-described processes and calculations to identify the location of the center of mass 102 and to transfer fuel between the fuel tanks 202, 204, and 206 to move the center of mass 102 toward the longitudinal axis 101 of the aircraft 100 and toward the aft limit AL. FIG. 3 is a block diagram of the controller 180, according to at least one aspect. The controller 180 includes a computer processor 302 and computer memory 304. The computer memory 304 stores computer-readable program code 306 that is executable to perform the above-described processes and calculations. The computer memory 304 may also store center of mass data 308 (e.g., lookup tables and/or equations) that provide, e.g., locations for the centers of mass of the fuel tanks as a function of fuel quantity and/or aircraft attitude. The computer memory 304 may also store center of pressure data 310 (e.g., lookup tables and/or equations) that provide, e.g., locations of the center of lift of the wing 106 and/or the elevators 112, e.g., based on the positions of the control surfaces, airspeed, angle of attack, and/or other applicable factors. The computer memory 304 may also store lift data 312 (e.g., lookup tables and/or equations) that provide e.g., lift components for the wings 106 and elevators 112, and for the control surfaces 116, 118, 120, and 122 thereon, e.g., based on the positions of the control surfaces, airspeed, angle of attack, and/or other applicable factors.

The controller 180 includes a first input 314 operable to receive signals indicating positions of control surfaces. For example, the first input 314 is in communication with sensors that detect positions of the control surfaces (e.g., the ailerons 116, elevator control surfaces 122, flaps 118, and/or slats 120). The sensors could be any kind of sensor that measures relative displacement of the control surfaces relative to the wings 106 and/or elevators 112. For example, angular displacement sensors and/or linear displacement sensors could measure the relative positions of the ailerons 116, flaps 118, and/or slats 120 relative to the wings 106 and of the elevator control surfaces 122 relative to the elevators 112. Signals output by the sensors are received by the first input 314. The computer processor 302 can then use the received sensor signals via the first input 314 to compute lift for the control surfaces (e.g., using the lift data 312 for control surfaces) and/or to compute centers of pressure for the wings 106 and/or elevators 112 (e.g., using the center of pressure data 310).

The controller 180 includes a second input 316 operable to receive signals indicating fuel masses (i.e., quantities) in the fuel tanks and fuel flow rates to the engines 142. The signals can be provided by sensors that detect fuel levels in the fuel tanks 202, 204, and 206 and/or by sensors that detect fuel flow. The sensors output signals that are received by the second input 316. As discussed above with reference to Equation (11), computer processor 302 can execute aspects of the computer-readable program code 306 to determine the current total mass m(t) of the aircraft 100 based on the fuel flow rates over the course of the flight and also to determine a mass distribution of the aircraft 100 based on the fuel masses in the fuel tanks 202, 204, and 206.

The controller 180 includes a third input 316 operable to receive signals indicating a pitch attitude and roll attitude of the aircraft. The pitch attitude is an angle of the nose of the aircraft relative to the horizon and the roll attitude is a bank angle of the wings relative to the horizon. The pitch and roll attitudes may be received from an attitude indicator in the cockpit. For example, modern avionics typically include an attitude and heading reference system (AHRS) that outputs pitch attitude and roll attitude signals (and other signals). The signals from the AHRS (or other pitch and roll attitude sensor(s)) are be received by the computer processor 302 via the third input 318, and the computer processor uses the received signals to determine centers of mass of the fuel tanks 202, 204, and 206 (e.g., using the center of mass data 308).

The controller 180 includes a fourth input 320 operable to receive signals indicating airspeed and angle of attack. The airspeed data could be provided by a pitot-static tube system on the aircraft and the angle of attack could be provided by an angle of attack vane system on the aircraft. Signals from the pitot static tube system and from the angle of attack vane system are received by the computer processor 302 via the fourth input 320. The computer processor 302 uses the received signals to compute lift components of the wings 106, elevators 112, and/or control surfaces 116, 118, 120, and/or 122 (e.g., using the lift data 312).

The controller 180 may include a fifth input 322 that is operable to receive various data from other avionics or flight computers onboard the aircraft 100. For example, the fifth input 322 may receive global positioning system (GPS) data that provides signals indicating a ground speed for the aircraft 100 as well as an altitude above sea level for the aircraft. The fifth input 322 may also receive signals indicating an outside air temperature from a temperature sensor mounted to the aircraft. The fifth input 322 may also receive signals indicating an air density and a static pressure from a static pressure sensor system. The fifth input 322 may also receive signals from a flight management computer indicating a weight of the aircraft 100 at pushback.

The controller 180 includes an output 324 that can send pumping command signals to a fuel transfer system operable to transfer fuel between different respective fuel tanks of the aircraft 100, based on the above-described calculations performed by the computer-readable program code 306 stored in the computer memory 304 and executed by the computer processor 302.

Figure 4:
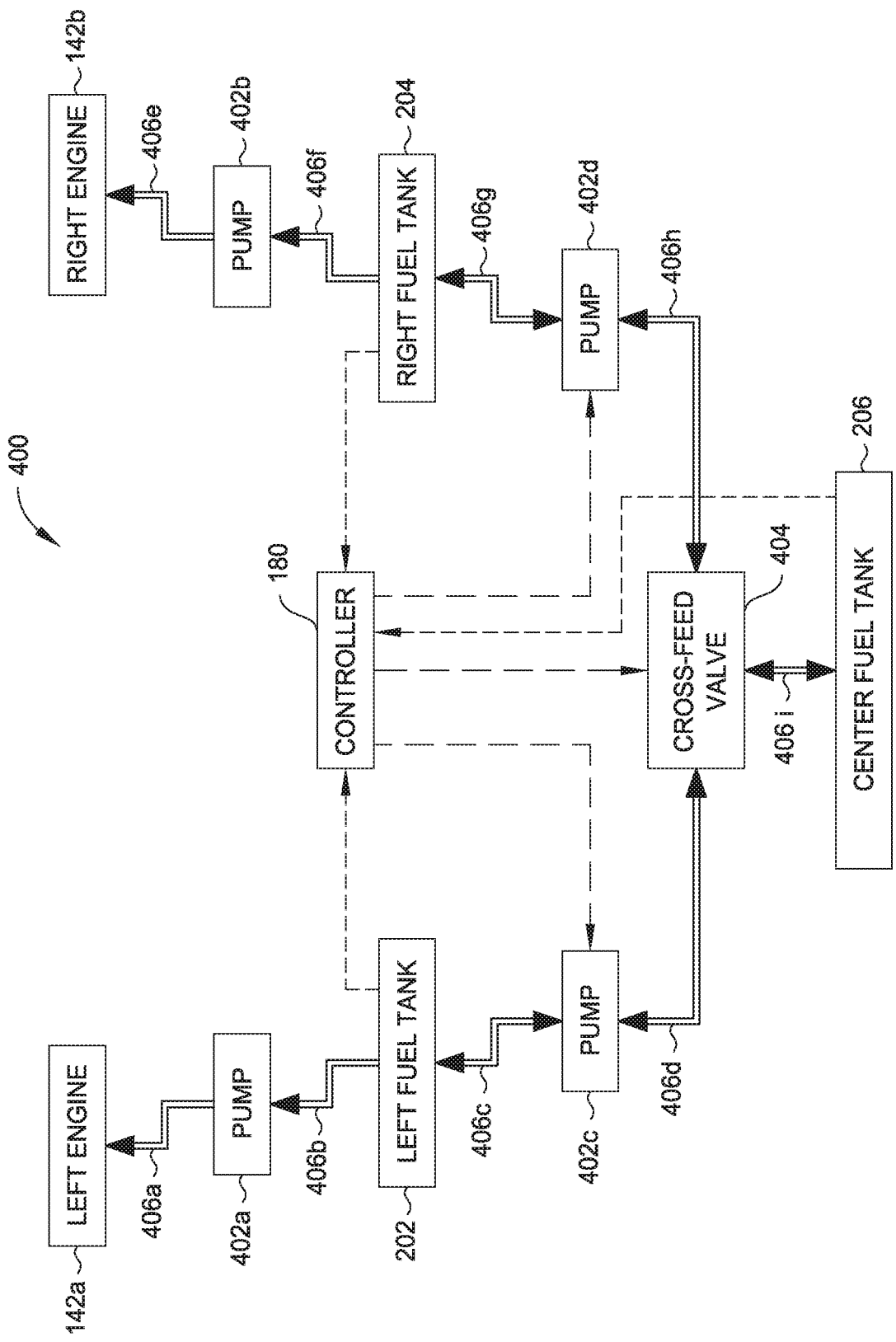
FIG. 4 is a block diagram of a fuel transfer system according to one aspect.

FIG. 4 is a block diagram of an exemplary fuel transfer system 400 according to one aspect. In the exemplary fuel transfer system 400, the left engine 142a of the aircraft 100 receives fuel from the left fuel tank 202 via a first pump 402a and via conduits 406a and 406b. Similarly, the right engine 142b of the aircraft 100 receives fuel from the right fuel tank 204 via a second pump 402b and via conduits 406e and 406f. The left fuel tank 202, right fuel tank 204, and center fuel tank 206 are connected to a cross-feed valve 404 via conduits and pumps. For example, the left fuel tank 202 is connected to the cross-feed valve 404 via a third pump 402c and conduits 406c and 406d. The right fuel tank 204 is connected to the cross-feed valve 404 via a fourth pump 402d and conduits 406g and 406h. The center fuel tank 206 is connected to the cross-feed valve 404 via a conduit 406i. The cross-feed valve 404 is selectively adjustable to different states such that different conduits to different fuel tanks are connected to each other. For example, in a first state, the cross-feed valve 404 connects the conduit 406d to the left fuel tank 202 to the conduit 406h to the right fuel tank 204 such that fuel can be transferred from the left fuel tank 202 to the right fuel tank 204 or vice versa. When the cross-feed valve 404 is in the first state, the third and fourth pumps 402c and 402d can be operated in a first direction to pump fuel from the left fuel tank 202 to the right fuel tank 204 and in a second direction to pump fuel from the right fuel tank 204 to the left fuel tank 202. In a second state, the cross-feed valve 404 connects the conduit 406d to the left fuel tank 202 to the conduit 406i to the center fuel tank 206 such that fuel can be transferred from the left fuel tank 202 to the center fuel tank 206 or vice versa. When the cross-feed valve 404 is in the second state, the third pump 402c can be operated in the first direction to pump fuel from the left fuel tank 202 to the center fuel tank 206 and in the second direction to pump fuel from the center fuel tank 206 to the left fuel tank 202. In a third state, the cross-feed valve 404 connects the conduit 406h to the right fuel tank 204 to the conduit 406i to the center fuel tank 206 such that fuel can be transferred from the right fuel tank 204 to the center fuel tank 206 or vice versa. When the cross-feed valve 404 is in the third state, the fourth pump 402d can be operated in the first direction to pump fuel from the center fuel tank 206 to the left fuel tank 202 and in the second direction to pump fuel from the left fuel tank 202 to the center fuel tank 206.

Figure 5:
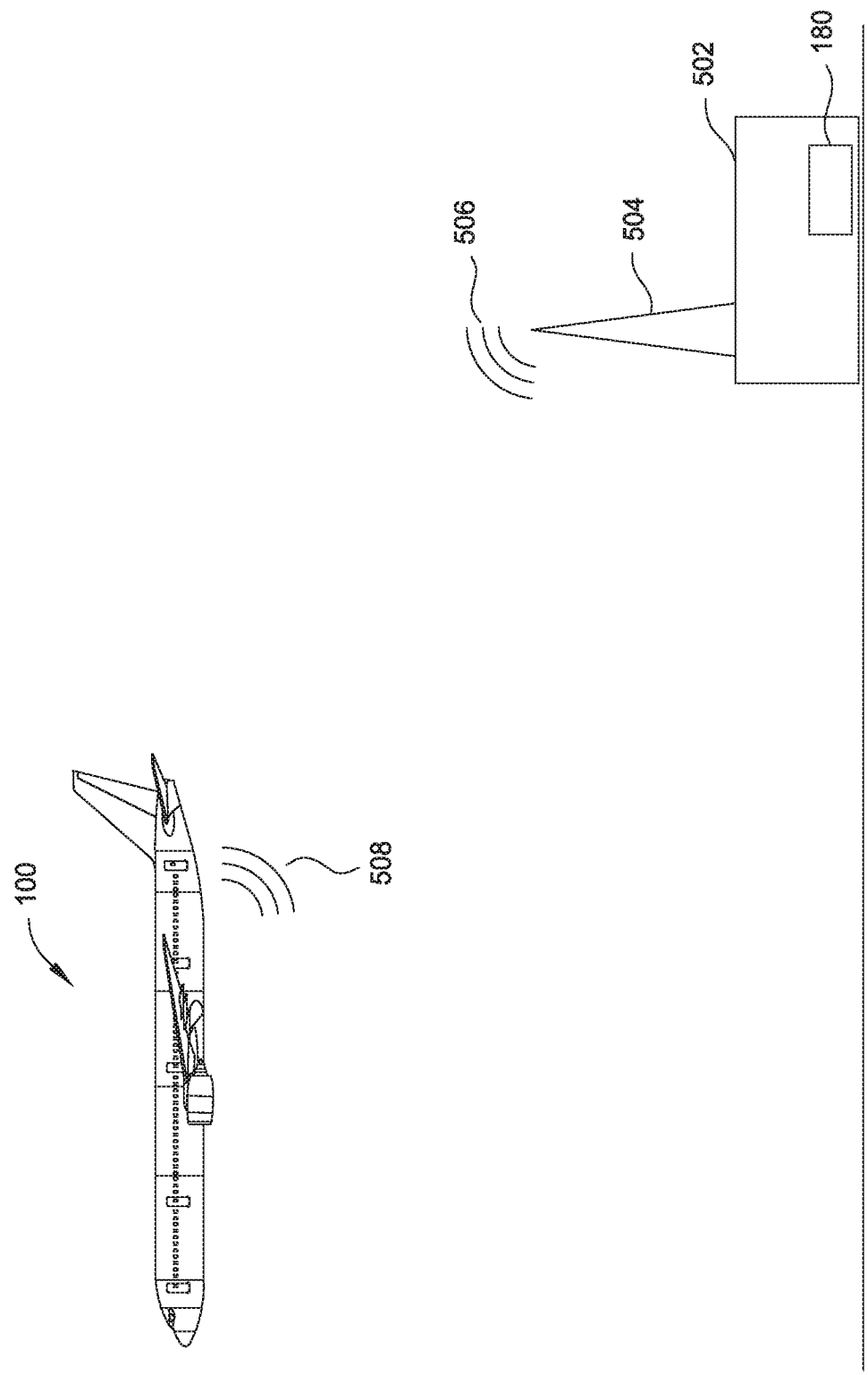
FIG. 5 is a block diagram of a system in which the controller is located remotely from the aircraft.

In at least one aspect, the controller 180 that calculates the location of the center of mass 102 of the aircraft 100 and/or controls fuel transfer to move the location of the center of mass 102 to the centerline and/or to the aft limit may be remotely located. Referring to FIG. 5, in at least one aspect, the controller 180 may be located at a ground station 502, such as a data center or operations center for the operator of the aircraft 100 (e.g., an airline). The ground station 502 includes a transceiver antenna 504 operable to receive signals 508 from the aircraft 100 (e.g., the signals received by the inputs 314, 316, 318, 320, and 322). The transceiver antenna 504 is also operable to transmit signals 506 to the aircraft 100 that include the pumping commands (e.g., the signals output by the output 324) for the fuel transfer system 400.

The controller 180 in FIG. 3 represents one possible configuration for such a controller. In other aspects, certain ones of the inputs 314, 316, 318, 320, and 322 may be combined and/or split into fewer or more inputs.

FIG. 6A is a flow chart for a method 600, according to one aspect, for transferring fuel from a first fuel tank of an aircraft to a second fuel tank of an aircraft to change the location of the center of mass. In block 602 of the method 600, positions of control surfaces on aerodynamic bodies (e.g., wings and/or elevators) of the aircraft are detected. For example, sensors could be used to determine the positions of elevators, ailerons, flaps, and/or slats. In block 604 of the method 600, aerodynamic forces of the aerodynamic bodies are calculated, based on the detected positions of the control surfaces. The aerodynamic forces of the aerodynamic bodies are generally known from test data, simulations, and/or wind tunnel models, and the resulting aerodynamic forces data may be stored in a lookup table or as a function of other variables, such as airspeed, angle of attack, and air density. In block 606 of the method 600, locations, relative to the aircraft, of centers of pressure of the calculated aerodynamic forces are determined. As discussed above, the centers of pressure may vary based on the positions of various control surfaces, such as flaps and/or slats. The centers of pressure may also vary based on an angle of attack of the aircraft. Again, such center of pressure data is generally known from test data, simulations, and/or wind tunnel models, and the center of pressure data may be stored in a lookup table or as a function of other variables, such as airspeed, angle of attack, and air density. In block 608 of the method 600, a current total mass of the aircraft is calculated. For example, the current total mass is calculated according to Equation (11), discussed above. In block 610, a location of a center of mass of the aircraft is calculated, based on the calculated aerodynamic forces, the determined locations, and the calculated current total mass. For example, the location of the center of mass in the longitudinal direction (X axis) and the lateral direction (Y axis) may be calculated according to Equations (6c) and (10b), respectively. An indication of the location of the center of mass may be provided to the pilot(s) of the aircraft 100. For example, a visual indication of the location of the center of mass may be transmitted for display on a display screen, such as an Engine Indication and Crew Alert System (EICAS) screen on the flight deck. The pilots can use the visual indication to transfer fuel among the fuel tanks to move the location of the center of mass toward the aft limit AL and/or toward the longitudinal axis 101 of the aircraft 100. Alternatively, the fuel may be automatically transferred to move the location of the center of mass toward the aft limit AL and/or toward the longitudinal axis 101 of the aircraft 100.

In block 612 of the method 600, fuel is automatically transferred from a first fuel tank of the aircraft to a second fuel tank of the aircraft to move the location of the center of mass toward a location of an aft center of mass limit (e.g., aft limit AL) and the longitudinal axis 101 of the aircraft. As fuel is transferred from the first fuel tank to the second fuel tank, blocks 602 through 610 of the method 600 are repeated until the calculated location of the center of mass is co-located with the aft limit (and with the centerline) of the aircraft. Additionally, as the fuel is transferred, the positions of aircraft control surfaces are changed such that the attitude of the aircraft 100 does not change. For example, as the location of the center of mass is moved toward the aft limit AL, the deflection of the control surfaces 122 of the elevators 112 may be decreased.

Referring now to FIG. 6B, in at least one aspect, an amount of fuel to be transferred from the first fuel tank to the second fuel tank can be calculated as part of block 612 of the method 600. In block 620, masses of fuel in respective fuel tanks of the aircraft are determined. The masses of fuel may be determined based on signals from sensors that measure the volumes of fuel in the fuel tanks (and then multiplying the indicated volumes by the density of the fuel). Alternatively, or in addition, the masses of fuel may be determined based on a known starting quantity of fuel in the respective fuel tanks and measuring quantities of fuel removed from and/or added to the fuel tanks during a flight. For example, with reference to FIG. 4, the fuel pumps 402 could include flow sensors to detect masses or volumes of fuel flowing to/from the respective fuel tanks. Such detected fuel flows are integrated over time to determine a change in quantity of fuel in the fuel tanks.

Referring again to FIG. 6B, in block 622, a remainder mass $x_{remainder}$ for the aircraft is calculated based on the already-determined total mass of the aircraft and the determined masses of fuel in the respective fuel tanks. As discussed above, the remainder mass is the mass of the empty aircraft, any passengers onboard, and any cargo onboard. As discussed above with reference to Equations (11) and (12), the remainder mass can be calculated, according to one aspect, by subtracting the respective masses of fuel in the fuel tanks from the current total mass m(t) of the aircraft 100.

In block 624, a location of the center of mass for the remainder mass $x_{remainder}$ for the aircraft is determined. As discussed above with reference to Equations (13b) and (14b), the location of the center of mass for the remainder mass $x_{remainder}$ can be determined along the longitudinal axis relative to the center of pressure 104 of the wings 106 and laterally from the longitudinal axis.

In block 626, an amount of fuel to transfer from a first fuel tank to a second fuel tank is calculated, based on the location of the aft center of mass limit AL, the calculated remainder mass $x_{remainder}$, and the determined location of the center of mass for the remainder mass $x_{remainder}$. As discussed above with reference to Equation (17b), an amount of fuel to be transferred from the left fuel tank 202 and the right fuel tank 204 to the center fuel tank 206 to move the center of mass $x_{mass}$ to the aft limit AL can be calculated. Additionally, with reference to Equations (18c) and (18d), an amount of fuel to transfer to the left fuel tank 202 from the right fuel tank 204 or vice versa to move the center of mass $x_{mass}$ to the longitudinal axis 101 (e.g., centerline) can be calculated. In block 628, an amount of fuel equal to the calculated amount of fuel can be transferred from the first fuel tank to the second fuel tank.

In various aspects, the above-described processes could be applied to other types of vehicles. For example, ships or boats may include trim tabs to adjust the "pitch" of the boat. However, use of the trim tabs adds drag, which can slow the ship or boat and/or increase fuel usage. Instead, it may be possible to identify a location of a center of mass of the ship or boat and transfer fuel between differently-located fuel tanks to change the location of the center of mass such that the deflection of the trim tabs can be reduced.

The descriptions of the various aspects have been presented for purposes of illustration, but are not intended to be exhaustive or limited to the aspects disclosed. Many modifications and variations will be apparent to those of ordinary skill in the art without departing from the scope and spirit of the described aspects. The terminology used herein was chosen to best explain the principles of the aspects, the practical application or technical improvement over technologies found in the marketplace, or to enable others of ordinary skill in the art to understand the aspects disclosed herein.

As will be appreciated by one skilled in the art, aspects of the present invention may be embodied as a system, method or computer program product. Accordingly, aspects of the present invention may take the form of an entirely hardware aspect, an entirely software aspect (including firmware, resident software, micro-code, etc.) or an aspect combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Aspects may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., a center of mass calculation algorithm) or related data available in the cloud. For example, the center of mass calculation algorithm could execute on a computing system in the cloud and output a location of a center of mass for a particular aircraft during the flight of that aircraft. In such a case, the center of mass calculation algorithm could calculate the location of the center of mass for the aircraft and transmit the calculated location of the center of mass to the aircraft. Doing so allows a user to access this information from any computing system attached to a network connected to the cloud (e.g., the Internet).

Aspects described herein may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some aspects, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects are described herein with reference to flowchart illustrations and/or block diagrams of methods, apparatus (systems), and computer program products according to aspects of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In the Figures, certain elements may be presented in a not-to-scale and/or exaggerated manner to better illustrate aspects described herein.

While the foregoing is directed to aspects of the present invention, other and further aspects of the invention may be devised without departing from the basic scope thereof, and the scope thereof is determined by the claims that follow.

What is claimed is:

1. A method for calculating a center of mass of an aircraft during flight, the method comprising:
    receiving a plurality of sensor signals indicating positions of a plurality of control surfaces on a plurality of aerodynamic bodies of the aircraft;
    calculating, based on the indicated positions, a plurality of aerodynamic forces of the plurality of aerodynamic bodies;

determining locations, relative to the aircraft, of centers of pressure of the plurality of aerodynamic forces;

receiving a current total mass of the aircraft; and calculating a location of the center of mass of the aircraft, based on the plurality of aerodynamic forces, the determined locations of the centers of pressure, and the received current total mass.

2. The method of claim 1, wherein receiving a current total mass of the aircraft comprises calculating the current total mass of the aircraft.

3. The method of claim 1, further comprising transferring fuel from a first fuel tank of the aircraft to at least a second fuel tank of the aircraft to move the location of the center of mass from the calculated location toward a location of an aft center of mass limit.

4. The method of claim 3, further comprising:

determining masses of fuel in respective fuel tanks of the aircraft;

calculating a remainder mass based on the received current total mass of the aircraft and the determined fuel masses in the fuel tanks of the aircraft, wherein the remainder mass comprises the mass of the aircraft when empty, any passengers onboard, and any cargo onboard;

calculating a location of a center of mass for the remainder mass, based on current total mass, the calculated location of the center of mass of the aircraft, the fuel masses of the fuel tanks, and respective locations of centers of mass of fuel in the fuel tanks; and calculating an amount of fuel to transfer from the first fuel tank to the second fuel tank based on the location of the aft center of mass limit, the calculated remainder mass, and the calculated location of the center of mass for the remainder mass, wherein transferring fuel from the first fuel tank to the second fuel tank comprises transferring the calculated amount of fuel from the first fuel tank to the second fuel tank.

5. The method of claim 4, wherein respective locations of centers of mass of fuel in the fuel tanks depend on fuel masses in the respective fuel tanks, and further comprising:

calculating the respective locations of the centers of mass of the fuel tanks based on determined fuel masses in the respective fuel tanks.

6. The method of claim 4, wherein respective locations of centers of mass of fuel in the fuel tanks depend on at least one of a pitch attitude and roll attitude of the aircraft, and further comprising:

calculating the respective locations of the centers of mass of the fuel tanks based on at least one of a determined pitch attitude and roll attitude of the aircraft.

7. The method of claim 1, wherein determining locations relative to the aircraft of centers of the plurality of aerodynamic forces comprises:

calculating centers of pressure for the respective aerodynamic bodies, based on at least one of airspeed, angle of attack, and the indicated positions of the control surfaces.

8. An aircraft, comprising:

a fuselage that includes a center fuel tank;

a left wing extending from the fuselage, the left wing comprising a left fuel tank and a left aileron;

a right wing extending from the fuselage, the right wing comprising a right fuel tank and a right aileron;

a left elevator;

a right elevator; and a controller operable to:

receive a plurality of sensor signals indicating positions of the left aileron, the right aileron, a control surface of the left elevator, and a control surface of the right elevator;

calculate aerodynamic forces of the left wing, the right wing, the left elevator, and the right elevator based on the indicated positions;

determine locations, relative to the aircraft, of centers of pressure of the calculated aerodynamic forces;

receive a current total mass of the aircraft; and calculate a location of a center of mass of the aircraft, based on the calculated aerodynamic forces, the determined locations of the centers of pressure, and the received current total mass of the aircraft.

9. The aircraft of claim 8, wherein the controller is operable to calculate the current total mass of the aircraft.

10. The aircraft of claim 8, further comprising a fuel transfer system in communication with the controller, wherein the fuel transfer system is operable to selectively transfer fuel from a first one or more of the left fuel tank, right fuel tank, and center fuel tank to a second one or more of the left fuel tank, right fuel tank, and center fuel tank, and wherein the controller directs the fuel transfer system to transfer fuel from a first one or more of the left fuel tank, right fuel tank, and center fuel tank to a second one or more of the left fuel tank, right fuel tank, and center fuel tank to move the location of the center of mass from the calculated location toward a location of an aft center of mass limit.

11. The aircraft of claim 10 wherein the controller directs the fuel transfer system to transfer fuel from the left fuel tank and from the right fuel tank to the center fuel tank to move the location of the center of mass toward a location of an aft center of mass limit.

12. The aircraft of claim 10, wherein the controller is further operable to:

determine respective masses of fuel in the left fuel tank, right fuel tank, and center fuel tank;

calculate a remainder mass based on the received current total mass of the aircraft and the determined fuel masses in the fuel tanks of the aircraft, wherein the remainder mass comprises the mass of the aircraft when empty, any passengers onboard, and any cargo onboard;

calculate a location of a center of mass for the remainder mass, based on current total mass, the calculated location of the center of mass of the aircraft, the fuel masses of the fuel tanks, and respective locations of centers of mass of fuel in the fuel tanks; and calculate an amount of fuel to transfer from the first fuel tank to the second fuel tank based on the location of the aft center of mass limit, the calculated remainder mass, and the calculated location of the center of mass for the remainder mass, wherein the controller directs the fuel transfer system to transfer the calculated amount of fuel from a first one or more of the left fuel tank, right fuel tank, and center fuel tank to a second one or more of the left fuel tank, right fuel tank, and center fuel tank.

13. The aircraft of claim 12, wherein respective locations of centers of mass of fuel in at least one of the left fuel tank, right fuel tank, and center fuel tank depend on fuel masses in the respective fuel tanks, and wherein the controller is further operable to:

calculate the respective locations of the centers of mass of the left fuel tank, right fuel tank, and center fuel tank based on determined fuel masses in the respective fuel tanks.

14. The aircraft of claim 12, wherein respective locations of centers of mass of fuel in at least one of the left fuel tank, right fuel tank, and center fuel tank depend on at least one of a pitch attitude and roll attitude of the aircraft, and wherein the controller is further operable to:
calculate the respective locations of the centers of mass of the left fuel tank, right fuel tank, and center fuel tank based on at least one of a determined pitch attitude and roll attitude of the aircraft.

15. The aircraft of claim 8, wherein determining locations of the centers of pressure comprises:
calculating respective centers of pressure for the left wing, the right wing, the left elevator, and the right elevator, based on at least one of airspeed, angle of attack, and the indicated positions of the left aileron, right aileron, the control surface of the left elevator, and the control surface of the right elevator.

16. The aircraft of claim 8, wherein the left wing further comprises a left flap,
wherein the right wing further comprises a right flap,
wherein the plurality of sensor signals further indicates positions of the left flap and the right flap, and
wherein determining locations of the centers of pressure comprises:
calculating respective centers of pressure for the left wing, the right wing, the left elevator, and the right elevator, based on at least one of airspeed, angle of attack, the indicated positions of the left aileron, the right aileron, the control surface of the left elevator, the control surface of the right elevator, the left flap, and the right flap.

17. A system, comprising:
at least one computer processor;
a first input communicatively coupled with the at least one computer processor, the first input operable to receive signals indicating positions of a plurality of control surfaces on a plurality of aerodynamic bodies of an aircraft; and
computer memory storing computer-readable program code that, when executed by the at least one computer processor, performs an operation comprising:
calculating, based on the indicated positions, a plurality of aerodynamic forces of the plurality of aerodynamic bodies;
determining locations, relative to the aircraft, of centers of pressure of the plurality of aerodynamic forces;
receiving a current total mass of the aircraft; and
calculating a location of a center of mass of the aircraft, based on the plurality of aerodynamic forces, the determined locations of the centers of pressure, and the received current total mass.

18. The system of claim 17, wherein receiving the current total mass of the aircraft comprises calculating the current total mass of the aircraft.

19. The system of claim 17, further comprising:
an output communicatively coupled with the at least one computer processor, the output operable to transmit pumping command signals to a fuel transfer system, wherein the operation further comprises:
outputting pumping command signals via the output to cause the fuel transfer system to transfer fuel from a first fuel tank of the aircraft to at least a second fuel tank of the aircraft to move the location of the center of mass from the calculated location toward a location of an aft center of mass limit.

20. The system of claim 19, further comprising:
a second input communicatively coupled with the at least one computer processor, the second input operable to receive signals indicating fuel masses in fuel tanks of the aircraft, wherein the operation further comprises:
calculating a remainder mass based on the received current total mass of the aircraft and received indications of respective fuel masses in the fuel tanks of the aircraft, wherein the remainder mass comprises the mass of the aircraft when empty, any passengers onboard, and any cargo onboard;
calculating a location of a center of mass for the remainder mass, based on current total mass, the calculated location of the center of mass of the aircraft, the fuel masses of the fuel tanks, and respective locations of centers of mass of fuel in the fuel tanks; and
calculating an amount of fuel to transfer from the first fuel tank to the second fuel tank based on the location of the aft center of mass limit, the calculated remainder mass, and the calculated location of the center of mass for the remainder mass,
wherein transferring fuel from a first fuel tank of the aircraft to a second fuel tank of the aircraft comprises transferring the calculated amount of fuel from the first fuel tank to the second fuel tank.

21. The system of claim 20, wherein respective locations of centers of mass of fuel in the fuel tanks depend on fuel quantities in the respective fuel tanks, and wherein the operation further comprises:
calculating the respective locations of the centers of mass of the fuel tanks based on determined fuel masses in the respective fuel tanks.

22. The system of claim 20, further comprising:
a third input communicatively coupled with the at least one computer processor, the third input operable to receive signals indicating a pitch attitude and a roll attitude of the aircraft,
wherein respective locations of centers of mass of fuel in the fuel tanks depend on at least one of a pitch attitude and roll attitude of the aircraft, and
wherein the operation further comprises:
calculating the respective locations of the centers of mass of the fuel tanks based on at least one of a determined pitch attitude and roll attitude of the aircraft.

23. The system of claim 18, further comprising:
a second input communicatively coupled with the at least one computer processor, the second input operable to receive signals indicating an airspeed and an angle of attack of the aircraft, wherein the operation further comprises:
calculating centers of pressure for the respective aerodynamic bodies, based on at least one of airspeed, angle of attack, and the indicated positions of the control surfaces.

* * * * *